(12) United States Patent
Honguh et al.

(10) Patent No.: US 6,565,248 B2
(45) Date of Patent: May 20, 2003

(54) LIGHT GUIDE, LINE ILLUMINATION APPARATUS, AND IMAGE ACQUISITION SYSTEM

(75) Inventors: Yoshinori Honguh, Kanagawa-ken (JP); Keisuke Maemura, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/736,120

(22) Filed: Dec. 15, 2000

(65) Prior Publication Data

US 2001/0019487 A1 Sep. 6, 2001

(30) Foreign Application Priority Data

Dec. 17, 1999 (JP) ............................. 11-358572
Mar. 16, 2000 (JP) ........................ 2000-073855

(51) Int. Cl.⁷ ............................... F21V 7/06; F21V 8/00
(52) U.S. Cl. ...................... 362/560; 362/551; 362/307; 385/146
(58) Field of Search ........................ 362/31, 242, 243, 362/247, 551, 555, 558, 231, 560, 307; 349/64, 65; 385/146, 901

(56) References Cited

U.S. PATENT DOCUMENTS

| | | | |
|---|---|---|---|
| 4,733,929 A | * 3/1988 | Brown | 362/558 |
| 4,912,605 A | * 3/1990 | Whitehead | 362/558 |
| 5,239,450 A | * 8/1993 | Wall | 362/31 |
| 5,274,228 A | * 12/1993 | Kaplan | 250/227.31 |
| 5,810,463 A | * 9/1998 | Kawahara et al. | 362/31 |
| 5,967,653 A | * 10/1999 | Miller et al. | 362/558 |
| 5,995,303 A | 11/1999 | Honguh et al. | 359/708 |
| 6,036,340 A | * 3/2000 | Fohl et al. | 362/31 |
| 6,139,174 A | * 10/2000 | Butterworth | 362/555 |
| 6,193,383 B1 | * 2/2001 | Onikiri et al. | 362/31 |
| 6,257,737 B1 | * 7/2001 | Marshall et al. | 362/231 |

FOREIGN PATENT DOCUMENTS

| | | |
|---|---|---|
| JP | 8-163320 | 6/1996 |
| JP | 2693098 | 9/1997 |
| JP | 10-126581 | 5/1998 |

* cited by examiner

*Primary Examiner*—Alan Cariaso
(74) *Attorney, Agent, or Firm*—Oblon, Spivak, McClelland, Maier & Neustadt, P.C.

(57) ABSTRACT

The present invention concerns a line illumination apparatus and an image acquisition system, comprising a light guide including a transparent member in the shape of a bar, and a light source provided at the end of the light guide in the longitudinal direction relative to the light guide, wherein the light guide comprises a scattering mark configured to scatter a light transmitted inside the transparent member from the light source substantially vertical to the longitudinal direction relative to the transparent member, a reflection surface having a curved surface configured to reflect a light scattered at the scattering mark inside the transparent member, and a light exit surface configured to enable a light reflected at the reflection surface to exit outside the transparent member therethrough.

26 Claims, 20 Drawing Sheets

LIGHT GUIDE, LINE ILLUMINATION APPARATUS, AND IMAGE ACQUISITION SYSTEM

BACKGROUND OF THE INVENTION

1. Field of the Invention

The present invention concerns a light guide, line illumination apparatus and image acquisition system, more particular, the apparatus and system used for facsimile and copying machines, a hand scanner, an optical character reader (OCR) and such.

2. Description of the Related Art

A line illumination apparatus for illuminating an object to obtain image data, for example, by image sensor has been used conventionally. The line illumination apparatus, which consists of a light source and a light guide, requires the light from the light source to illuminate an object efficiently.

A light guide used in such type of line illumination apparatus is disclosed in, for example, a Japanese Open-laid Patent No. 163320/1996. An operation of such line illumination is shown in principle in FIG. 19.

In FIG. 19, a light guide 101a is made of transparent resin and is provided with a light emitting diode (LED) 102a as a light source at an end surface thereof. When it is used for a color image scanner, a light having exited from the LED 102a is reflected at the wall surface inside the light guide and transmitted toward the other end surface.

The transmitted light is scattered at a scattering mark 103a. The diffused light, which does not meet the condition of total reflection, of the scattered light is outputted outside through a light exit surface 113a. The scattering mark 103a is formed by means of white paint, diffusion agent added paint, or the like.

Outside the light guide is provided a reflection board 120a as shown in FIG. 20. A light scattered at the scattering mark 103a is led into the light guide 101a again when it hits the reflection board 120a even after outputted outside the light guide 101a. The reflection board 120a is formed by means of a white diffusing reflection material.

A part near the illumination area 104a of the light guide 101a is arranged to output a light outside as a light exit surface 113a. The light exiting through this light exit surface 113a illuminates the illumination area 104a via a glass board 105a.

In this example, the light, part of which is outputted outside due to the scattering mark 103a through the light exit surface 113a of the light guide 101a, decreases in intensity by the outputted amount of light. That is, the farther the light source is distanced, the more the intensity of light attenuates gradually. In order to further improve the efficiency of obtaining the light as it goes away from the light source, it has been performed to make the illumination at the illumination area 104a uniform by increasing the density of the scattering mark 103a or by widening the mark.

In the conventional technology, however, the light scattered at the scattering mark is further reflected and scattered at the reflected board repeatedly, so that the light exiting from the light guide has a component to be transmitted in various direction. Thus, it was difficult to sufficiently hold down the unnecessary light that illuminates even an area far away from the illumination area. Therefore, it has been problems that the light emitted by the light source is difficult to be used efficiently, and that it is difficult to achieve the enough illumination without increasing the electric power consumed by the light source.

Further, raising the illumination of the illumination area near the light source could not make the illumination of the whole illumination area uniform since the light emitted by the sole light source provided at one end of the light guide illuminates the whole illumination area. It is because the light emitted by the light source illuminates the illumination area after scattered at the scattering mark and outputted outside the light guide through the light exit surface. Insufficient scattering of light near the light source of the light guide reduces the amount of light outputted through the light exit surface, which causes a shortage of the illumination.

Thus, in conventional arrangement, it could not be achieved that the whole illumination area being illuminated at the uniform illumination by raising the illumination of the illumination are a near the light source, though the illumination of the illumination area away from the light source could be raised.

An object of the present invention is to provide a light guide, a line illumination apparatus and an image acquisition system, capable of efficiently illuminating the illumination area with the light emitted by the light source.

Another object of the present invention is to provide a light guide, a line illumination apparatus and an image acquisition system, capable of uniformly illuminating the whole illumination area at the sufficient illumination with a simple arrangement.

SUMMARY OF THE INVENTION

To accomplish the object described above, the present invention provides a light guide, line illumination apparatus and image acquisition system having the constructions listed below.

The first aspect of the invention, a light guide comprises a transparent member in the shape of a bar, a scattering mark configured to scatter a light transmitted inside the transparent member substantially vertical to the longitudinal direction relative to the transparent member, a reflection surface, having a curved surface, configured to reflect a light scattered at the scattering mark inside the transparent member, and a light exit surface configured to enable a light reflected at the reflection surface to exit outside the transparent member therethrough.

The second aspect of the invention, a light guide comprises a transparent member in the shape of a bar, a scattering mark configured to scatter a light transmitted inside the transparent member substantially vertical to the longitudinal direction relative to the transparent member, a reflection surface, having a curved surface, configured to reflect a light scattered at the scattering mark inside the transparent member, a first light exit surface configured to enable a light reflected at the reflection surface to exit outside the transparent member therethrough, and a second light exit surface configured to enable a light scattered at the scattering mark to exit outside of the transparent member therethrough.

The third aspect of the invention, a line illumination apparatus comprises a light guide including a transparent member in the shape of a bar, and a light source provided at the end of the light guide in the longitudinal direction relative to the light guide, wherein the light guide comprises a scattering mark configured to scatter a light transmitted inside the transparent member from the light source substantially vertical to the longitudinal direction relative to the transparent member, a reflection surface, having a curved surface, configured to reflect a light scattered at the scattering mark inside the transparent member, and a light exit surface configured to enable a light reflected at the reflection surface to exit outside the transparent member therethrough.

The fourth aspect of the invention, a line illumination apparatus comprises a light guide including a transparent member in the shape of a bar, and a light source provided at the end of the light guide in the longitudinal direction relative to the light guide wherein the light guide comprises a scattering mark configured to scatter a light transmitted inside the transparent member from the light source substantially vertical to the longitudinal direction relative to the transparent member a reflection surface, having a curved surface, configured to reflect a light scattered at the scattering mark inside the transparent member, a first light exit surface configured to enable a light reflected at the reflection surface to exit outside the transparent member therethrough, and a second light exit surface configured to enable a light scattered at the scattering mark to exit outside of the transparent member therethrough.

The fifth aspect of the invention, an image acquisition system comprises a light guide including a transparent member in the shape of a bar, a light source provided at the end of the light guide in the longitudinal direction relative to the light guide, an image forming optical device configured to form an image of a light from an illumination area illuminated by a light exiting from the light guide, and n image sensor configured to read a light of the image formed by the image forming optical device, wherein the light guide comprises a scattering mark configured to scatter a light transmitted inside the transparent member from the light source substantially vertical to the longitudinal direction relative to the transparent member, a reflection surface, having a curved surface, configured to reflect a light scattered at the scattering mark inside the transparent member, and a light exit surface configured to enable a light reflected at the reflection surface to exit outside the transparent member therethrough.

The sixth aspect of the invention, an image acquisition system comprises a light guide including a transparent member in the shape of a bar, a light source provided at the end of the light guide in the longitudinal direction relative to the light guide, an image forming optical device configured to forming an image of a light from an illumination area illuminated by a light exiting from the light guide, and an image sensor configured to read a light of the image formed by the image forming optical device, wherein the light guide comprises a scattering mark configured to scatter a light transmitted inside the transparent member from the light source substantially vertical to the longitudinal direction relative to the transparent member, a reflection surface, having a curved surface, configured to reflect a light scattered at the scattering mark inside the transparent member, a first light exit surface configured to enable a light reflected at the reflection surface to exit outside the transparent member therethrough, and a second light exit surface configured to enable a light scattered at the scattering mark to exit outside of the transparent member therethrough.

The seventh aspect of the invention, a line illumination apparatus comprises, a light guide including of a transparent member in the shape of a bar, and a light source provided at a first end of the light guide in the longitudinal direction relative to the light guide, wherein the light guide comprises a scattering mark configured to scatter a light emitted by the light source, a light exit surface configured to enable a light scattered at the scattering mark to exit outside the transparent member therethrough, and a reflection portion, provided near the first end, configured to interrupt a light, which is emitted by the light source, to be transmitted to a second end facing to the first end and for reflecting the interrupted light so as to enable the interrupted light to exit from the light exit surface located near the light source.

The eighth aspect of the invention, an image acquisition system comprises, a light guide including a transparent member in the shape of a bar, a light source provided at the end of the light guide in the longitudinal direction relative to the light guide, an image forming optical device configured to form an image of a light from an illumination area illuminated by a light exiting from the light guide, and an image sensor configured to read a light of the image formed by the image forming optical device, wherein the light guide comprises a scattering mark configured to scatter a light emitted by the light source, a light exit surface configured to enable a light scattered at the scattering mark to exit outside the light guide therethrough, and a reflection portion, provided near the first end, configured to interrupt a light, which is emitted by the light source, to be transmitted to a second end facing to the first end and for reflecting the interrupted light so as to enable the interrupted light to exit from the light exit surface located near the light source.

The ninth aspect of the invention, a line illumination apparatus comprises a light guide including of a transparent member in the shape of a bar, and a plurality of light sources provided along the longitudinal direction relative to the transparent member, wherein the light guide comprises a reflection surface, having a curved surface, configured to reflect a light emitted by the light source inside the transparent member, and a light exit surface configured to enable a light reflected at the reflection surface to exit outside the transparent member therethrough.

The tenth aspect of the invention, an image acquisition system comprises a light guide including of a transparent member in the shape of a bar, a plurality of light sources provided along the longitudinal direction relative to the light guide, an image forming optical device configured to form an image of a light from an illumination area illuminated by a light exiting from the light guide, and an image sensor configured to read a light of the image formed by the image forming optical device, wherein the light guide comprises a reflection surface, having a curved surface, configured to reflect a light emitted by the light source inside the transparent member, and a light exit surface configured to enable a light reflected at the reflection surface to exit outside the transparent member therethrough.

According to the present invention, the light scattered at the scattering mark is effectively led to the illumination area, so that a line illumination apparatus with a simple arrangement and high efficiency can be achieved.

It is also available to provide a compact line illumination apparatus or an image acquisition system at a low cost by adopting the light guide according to the present invention.

In addition, according to the present invention, the reflection of the light emitted by the light source at a reflection portion of the light guide can uniform the illumination of the whole illumination area illuminated by the reflected light.

DETAILED DESCRIPTION OF THE PREFERRED EMBODIMENTS

Figure 1:
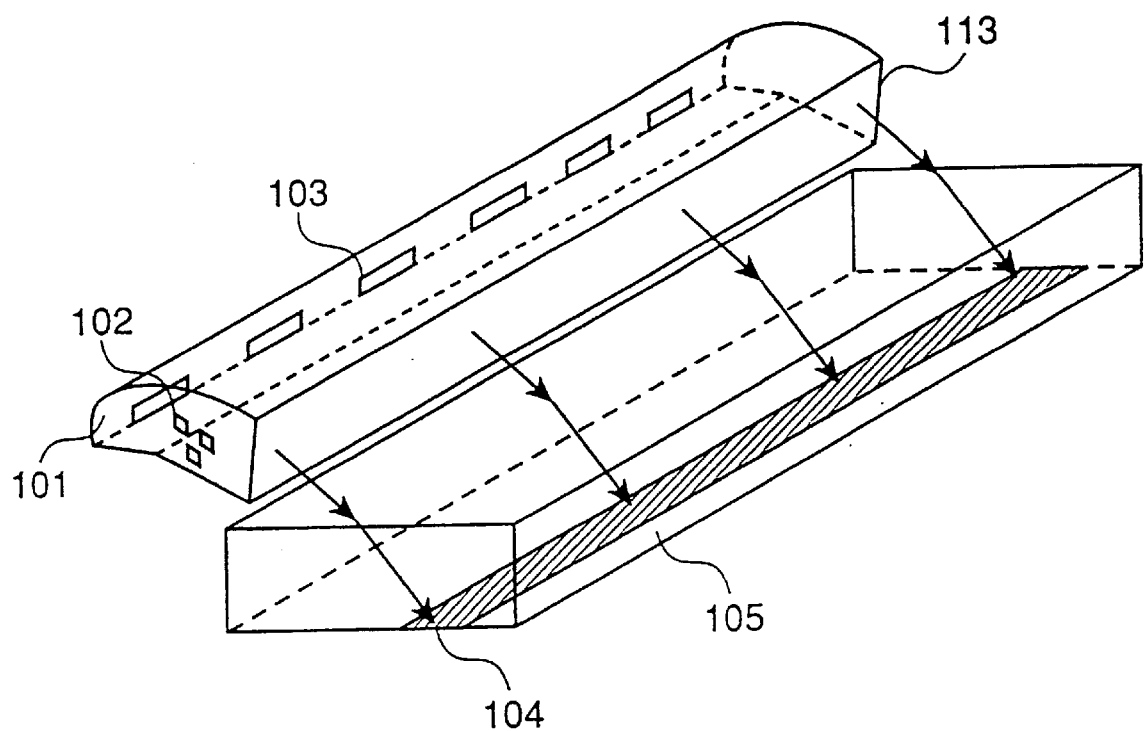
FIG. 1 shows an arrangement of an illumination apparatus of the first embodiment of the present invention.

Embodiments of the present invention are described in detail hereinafter, referring to the drawings.

First of all, the first embodiment will be described.

FIG. 1 shows an arrangement of a line illumination apparatus used a light guide of the first embodiment In FIG. 1, a light guide 101 is made of transparent resin and provided at an end surface thereof with LEDs 102 as a light source. The illumination apparatus can consist of a light source (LED) and a light guide. There are provided 3 or, if needed, more light sources having emission wavelengths of red, green and blue, since the illumination consisting of 3 colors of light is required when the apparatus is used in a color scanner and such.

In FIG. 1, totally 3 LEDs 102, each of which corresponds to each color, are provided. The light emitted by the light source LEDs 102 is reflected at a wall surface inside the light guide and transmitted toward the other end surface. The light source may be provided at the both side surfaces when the high illumination is required, but in recent improvement of the efficiency of LED emission, providing the light source only at one end surface can secure a sufficient amount of light for various purposes of use. It is also possible to use the light transmitted forth and back, when the light source is provided only at one end surface, by carrying out a process for increasing the reflection of the other end surface. In the both cases, the light, which meets the condition of the total reflection, can be transmitted without attenuation in relation to the reflection inside the light guide 101, so that the energy can be transmitted at high efficiency.

The transmitted light is scattered at the scattering mark 103, which generates a diffusion light, which does not meet the condition of the total reflection, to output it outside from the light guide 101 so as to illuminate an illumination area 104 via a glass board 105. The scattering mark 103 can be formed by various means such as white paint or diffusion agent added paint applied to, or metal, paper, resin or other small strip member having the diffusion surface adhered by means of transparent glue to the predetermined location of the light guide, and can be selected according to the way of use and also in view of manufacturability and cost as well as function.

It is also possible to change the shape of the predetermined area of the surface of the light guide 101. For example, the shaded surface of the scattering mark can be waved slightly so as to be a rough diffusion surface, or a reflection surface with a predetermined shape of wave can be formed so as to use the operation of reflecting and refracting in a predetermined direction the light transmitted on the condition of total reflection.

Thus, there are various types of concrete means for forming the scattering mark. In the embodiment shown in FIG. 1, the scattering mark 103 is formed by means of white paint applied to a thin, oblong area. Other types of means also can be used for forming the scattering mark 103. The type of means for forming the scattering mark does not limit the present invention. Other types of means for forming the scattering mark are described later.

The intensity of the transmitted light attenuates gradually as it goes away from the light source, when a part of the transmitted light is outputted due to the scattering mark 103 through the light exit surface outside the light guide. Increasing the efficiency of obtaining a light as it goes away from the light source makes it possible to uniform the illumination of the illumination area. As its concrete means, in the embodiment shown in FIG. 1, the density of the scattering mark 103 is increased as it goes away from the light source. It is also achievable by increasing the width of the scattering mark.

In the case of the scattering mark formed by providing the light guide with projections and concaves, the size, depth and/or density of the projections and concaves can be changed, while in the case of that of rough surface, the surface roughness can be changed, for example. Thus, there are various possible means for achieving the uniformity of the illumination, and they do not limit the present invention.

Figure 2:
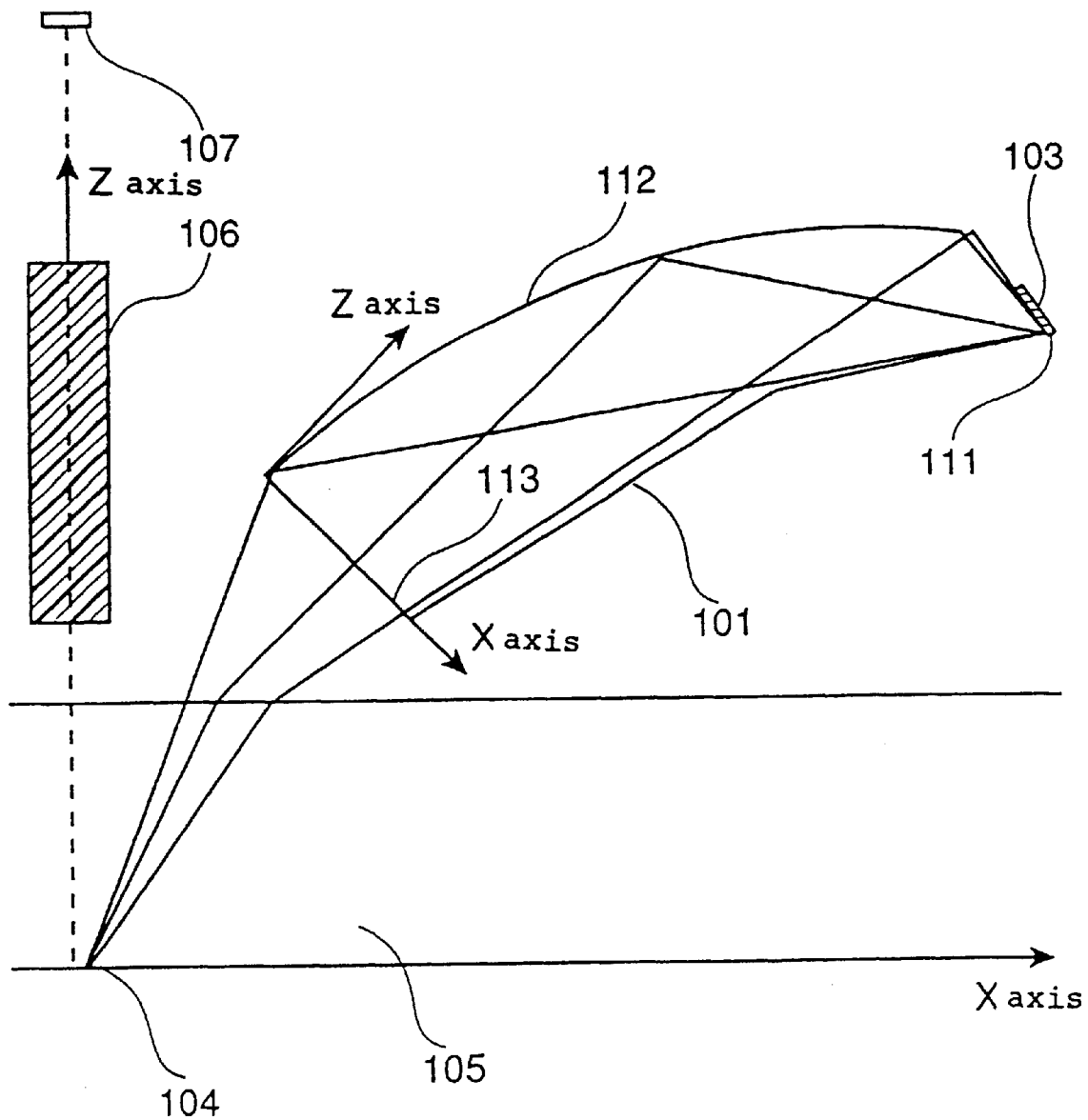
FIG. 2 shows a cross-section of the light guide and the optical path of the illumination light in the illumination apparatus of the first embodiment.

FIG. 2 shows a cross-section of the light guide and the optical path of the illumination light in the illumination apparatus of the first embodiment according to the present invention. In FIG. 2, an image at a location for reading an original 104 is formed by a cellfok lens 106 via the glass board 105 and read out as line data at a CCD linear image sensor 107. The illumination apparatus for illuminating the location for reading an original 104 comprises the light guide 101, the scattering mark 103 formed near a ridge portion 111 on the rear side of the light guide (which is opposite to the light exit surface), and the light source such as LEDs, which are not shown, provided at the end surface of the light guide. The cellfok lens array, the CCD linear image sensor and the illumination apparatus are integrated into one body to comprise an image sensor module.

In the illumination apparatus of the present embodiment, the light emitted by the light source not shown is transmitted in the longitudinal direction relative to the light guide, reflecting repeatedly. Almost all of the light hitting, on the way of transmitting, the scattering mark 103 formed near the ridge portion 111 on the rear side has an incident angle larger than a critical angle and thereby totally reflected, so that loss of the light does not occur at the reflection surface 112. The reflected light exits outside the light guide through the light exit surface 113. The light other than a part of light vertically transmitted to the light exit surface 113 is deflected at the surface 113 as a result of the refracting operation. The light exiting from the light guide 101 enters into the glass board 105 slantly. The light proceeding direction is deflected by refraction also on this surface.

In forming an image acquisition system using the illumination apparatus shown in FIG. 1, an equal magnification erect image sensor such as cellfok lens array in a projection optical system arranged at the front of the illumination area as shown in FIG. 2, for example, can be used for image forming with an image sensor such as CCD line sensor provided near the original, and also can be used for comprising a compact image acquisition system by integrating the light source, light guide, lens array and line sensor device into one body.

The image acquisition system so comprised is a line image acquisition system for acquiring a line of image. Therefore, in order to acquire a whole image of two dimensions, it is necessary to comprise an apparatus including a scanner mechanism for changing a relative location between the original and the line image acquisition system. The scanner mechanism can be obtained in a manner of transferring the original automatically with the image acquisition system fixed, that of transferring automatically the image acquisition system with the original fixed, and that of using manpower as a power for scanning, that is, manually scanning, and detecting the transferred distance by the scanner mechanism in order to make the system easy-handling. Accordingly, the image acquisition apparatus can be formed as a two dimensions image acquisition system and as an image acquisition system used as a partial apparatus thereof, both of which are included in the present invention.

A reflection surface 112 of the light guide 101 is a curved surface designed so that the light exiting from the ridge portion 111 is reflected at the reflection surface to be refracted at the light exit surface 113 and the surface of the glass board 105 before illuminating the location for reading an original 104 correctly. Reading out an original via the glass board 105 like this embodiment, allows the optical system to be separated from the outside, so that the apparatus can be prevented from being aged by dust coming from, for example, the outside.

The transparent board referred to as a glass board here may be an acrylic or polycarbonate board or a board made of another resin. Preferably, these boards are surface-processed by means of such as protection coating since these materials are easily damaged. Both of glass and resin boards can be coated with an anti-reflection coat in order to hold down the loss caused by light reflection. The selection of the material and the way of processing is determined for every apparatus according to the purpose of using, the price and such, and does not limit the present invention.

The way of determining a concrete shape of the reflection surface 112 is not limited to a certain way of designing, and is preferably to design so that it can be changed flexibly in accordance with the thickness or refractive index of the glass board or the size of the apparatus. In this embodiment, it is required that the light exiting from the point 111 shown in the cross-sectional view is reflected at the reflection surface 112 to be converged at one point via two refractive surfaces (the light exit surface 113 of the light guide 101 and the top surface of the glass board 105). It is generally difficult, however, to seek the rigorous solution of such problem by analysis. Therefore, the design by some approximate solution is necessary. Usually, there is a method to be considered, in which the curved shape of the reflection surface 112 is represented by a formula including some unknown designing parameters, which are determined according to the manner of optimization so that the optical path becomes close to the desired one for some sample lights.

In this embodiment, assuming that the materials and thickness of the glass board 105, the materials of the light guide 101 and the location of the light exit surface 113 are determined first in a process of designing an apparatus, an optimizing calculation based on the least-square method determines the curved surface by means of a model in which an optical path is traced reversely. In the drawings, the location for reading an original 104 is illuminated at various illumination angles from 25 to 63 degrees. The 41 rays of light at the angle within this range are considered to be sample lights, which are traced reversely and optimizing-calculated so that the light is close to the ridge portion 111 as much as possible after two times of refraction and one time of reflection. More concretely, the curved surface is determined in accordance with a manner of a non-linear least-square method so that the sum of square of the distance between the rays just after the reflection of each light and the ridge portion 111 when the light is reversely traced should become minimum. In the shape of the curved surface, X axis is set along the light exit surface 113 slanted at 45 degrees relative to the glass surface as shown in drawings, Z axis is set in the direction vertical to the X axis, and the formula representing the curve is the following formula (1):

$$X = C(1)Z + C(2)Z^2 + C(3)Z^3 + C(4)Z^4 + C(5)Z^5 + C(6)Z^6 + C(7)Z^7 + C(8)Z^8 + C(9)Z^9 + C(10)Z^{10} + C(11)Z^{11} + C(12)Z^{12} \quad \text{Formula (1)}$$

wherein, the coefficients $C(1)$, $C(2)$, ..., $C(12)$ are the unknown designing parameters determining the curve.

In this embodiment, 41 rays of sample light and 12 unknown parameters are used for designing. The above numbers are determined as follows: first, setting the number of unknown parameters considered to have a sufficient degree of freedom; and secondly, setting a number of sample lights which are sufficiently more than the number corresponding to the degree of freedom. Insufficient number of sample lights may cause a solution to be converged such that the distance becomes long for the light near the sample light while the sum of the square of the distance for the sample light becomes small. A reasonable designing can be achieved by checking the reasonability of the solution and the amount of the residual difference in order to confirm that a reasonable solution has been obtained. In this embodiment, the above numbers are set as follows, wherein E denotes the power of ten.

| j | C (j) |
|---|---|
| 1 | 0.199843443E + 00 |
| 2 | 0.255652599E − 01 |
| 3 | 0.450216023E − 02 |
| 4 | −0.520065587E − 02 |
| 5 | 0.353652426E − 02 |
| 6 | −0.128589782E − 02 |
| 7 | 0.212132293E − 03 |
| 8 | 0.108665918E − 04 |
| 9 | −0.114005138E − 04 |
| 10 | 0.208047134E − 05 |
| 11 | −0.170800548E − 06 |
| 12 | 0.549947388E − 08 |

As shown in the above, relating also to the apparatus for reading the original through the transparent board such as glass board, forming a light guide having a reflection surface in the shape determined in a manner such as optimization can hold down as much as possible the useless light illuminating the area other than the location for reading an original so as to obtain the effective and efficient illumination.

In the first embodiment, it was shown that the light guide, which has a certain shape of cross-section in its longitudinal direction, is used for adjusting the efficiency of the scattering mark to achieve the uniformity of the illumination in the longitudinal direction. On the other hand, the effiency of obtaining the light can be adjusted in a manner that the area of the cross-section of the light guide is made smaller as it goes away from the light source. The uniform illumination also can be obtained at a high efficiency in this manner as well as another manner used with this manner together. In this case, the shape of cross-section of the light guide changes gradually according to the location in the longitudinal direction. Usually, it is easy to design such that the area of the cross-section becomes smaller. Thus, the change of the shape of the cross-section, if any, is gradual, and forming the shape of the cross-section at each location as same as that of the embodiment described above results in the highly efficient and good illumination in a same operation.

The second embodiment will be described next.

Figure 3:
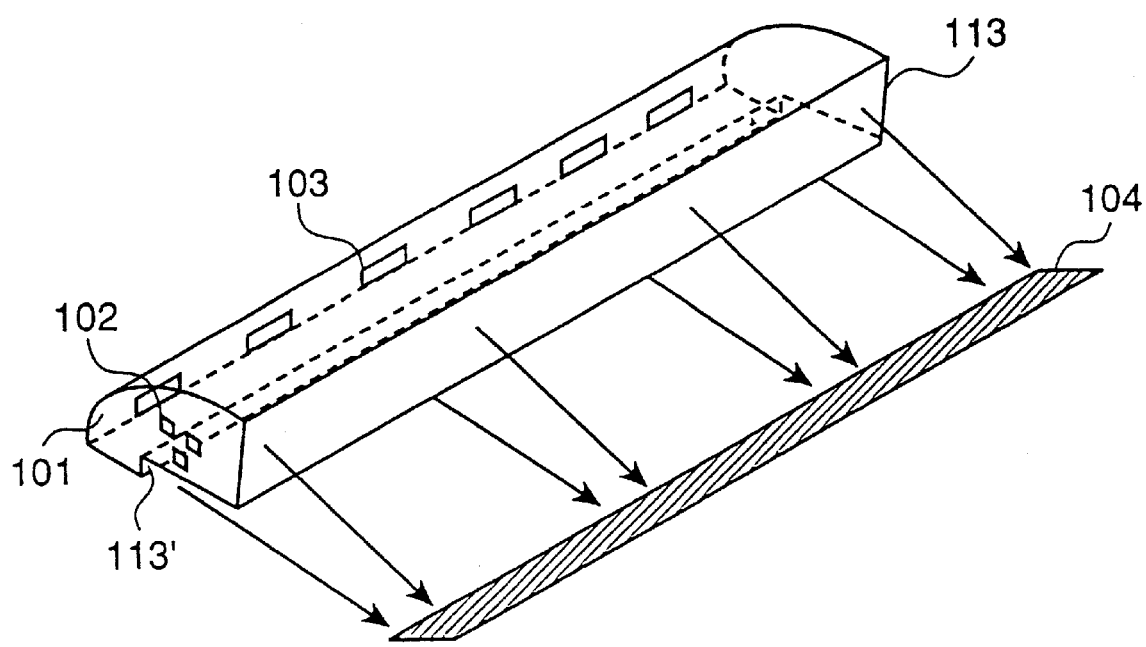
FIG. 3 shows an arrangement of the illumination apparatus of the second embodiment of the present invention.

FIG. 3 shows a whole arrangement of an illumination apparatus of the second embodiment according to the present invention.

In FIG. 3, a light guide 101 is made of transparent resin, and provided with a light source LEDs 102 at an end surface thereof. There are also provided 3 LEDs 102 which have emitting wavelengths of red, green and blue in this embodiment as same as the first embodiment.

The light exiting from the light source LEDs 102 is reflected at a wall surface inside the light guide 101 and transmitted toward the other end surface. The transmitted light is scattered at the scattering mark 103, which generates a diffusion light that does not meet the condition of the total reflection, the diffusion light being outputted outside from the light guide 101 so as to illuminate an illumination area 104.

Figure 4:
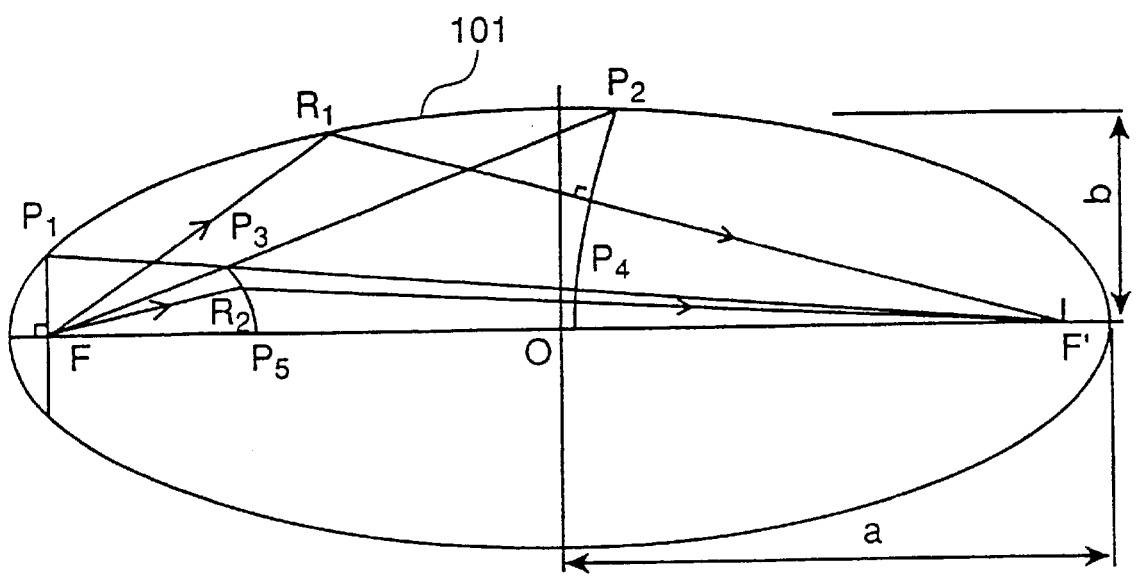
FIG. 4 shows a cross-section of the light guide in the illumination apparatus of the second embodiment.

FIG. 4 shows a cross-section of the light guide 101 in the illumination apparatus of the second embodiment. In FIG. 4, the area enclosed by a bold line passing through the points F, P1, P2, P4, P3 and P5 represents the cross-section of the light guide. The curve connecting the point P1 and P2 is a part of an ellipse whose longer diameter is a, and whose shorter diameter is b. The point F is one focus of the ellipse, while the point F' is the other focus thereof. The scattering mark is formed near the point F. The point P1 is a point where a line passing through the point F and vertical to the longer axis of the ellipse crosses with the ellipse. A reflection at the arc of the ellipse is a total reflection and the reflected light goes to the focus F', when the incident angle to the arc of the ellipse is more than a critical angle upon reaching the point P1 of the light outputted from the scattering mark located at the point F. In this condition, the incident angle at an optional point R1 on the arc of the ellipse P1P2 is more than critical angle, and thus, the reflection is a total reflection and the reflected light goes to the point F'. The point P3 is a cross-point of line segments FP2 and P1F'. P4 is a cross-point of an arc of the circle, whose center is F' and which passes through the point P2, and the line segment P1F'. The arc of the circle P2P4 consists a part of the cross-section of the light guide 101. The light reflected at the arc of the ellipse P1P2 enters vertically to the arc of the circle P2P4 and thereby goes straight toward the point F'. An illumination area 104 is located near this point F'. The curve from the point P3 to P5 is a curve defined such that the light emitted from the point F goes toward the point F' after refracted at the point R2 on the curve. The cross-section arranged as mentioned above leads the light scattered at the scattering mark to the illumination area efficiently.

A process for determining the shape of the curve by means of concrete numerals is described below. First, the formula of the ellipse is shown in the following formula (2):

$$(x/a)^2+(y/b)^2=1 \qquad \text{Formula (2)}$$

A distance f from the center O of the ellipse to the focus F is shown in the following formula (3):

$$f^2=a^2-b^2 \qquad \text{Formula (3)}$$

An incident angle θ at the point P1 (an angle formed between the proceeding direction of the incident light and the normal of the plane) is given by the following formula (4):

$$\tan \theta = f/a \qquad \text{Formula (4)}$$

A critical angle θc of the medium having the refractive index of n is given by the following formula (5):

$$\sin \theta c = 1/n \qquad \text{Formula (5)}$$

f is further set so as to meet the following formula (6):

$$f = a \cdot \tan(\sin^{-1}(1/n)) \qquad \text{Formula (6)}$$

Namely, given the value of a, is determined the values of f and b, thereby the locations of the points F, F' as well as that of P1. Then, the location of the point P2 is determined by using the restriction of the operation distance to be secured as a distance between the light guide and the illumination area, thereby, the point P3 is determined as a cross-point of the line segments FP2 and P1F', as well as the location of the point P4 is determined. The location of the point P5 is determined under a condition that the length of the optical path from the point F through the point P3 to the point F' is same as the one from the point F through the point P5 to the point F'. The curve from the point P3 to P5 is defined under a condition that the length of the optical path from the point F through the optional point R2 on the curve to the point F' is same as all the above length. In many cases, setting a proper smooth curve from the point P3 to P5 also can obtain sufficient performance.

The third embodiment will be described next.

Figure 5:
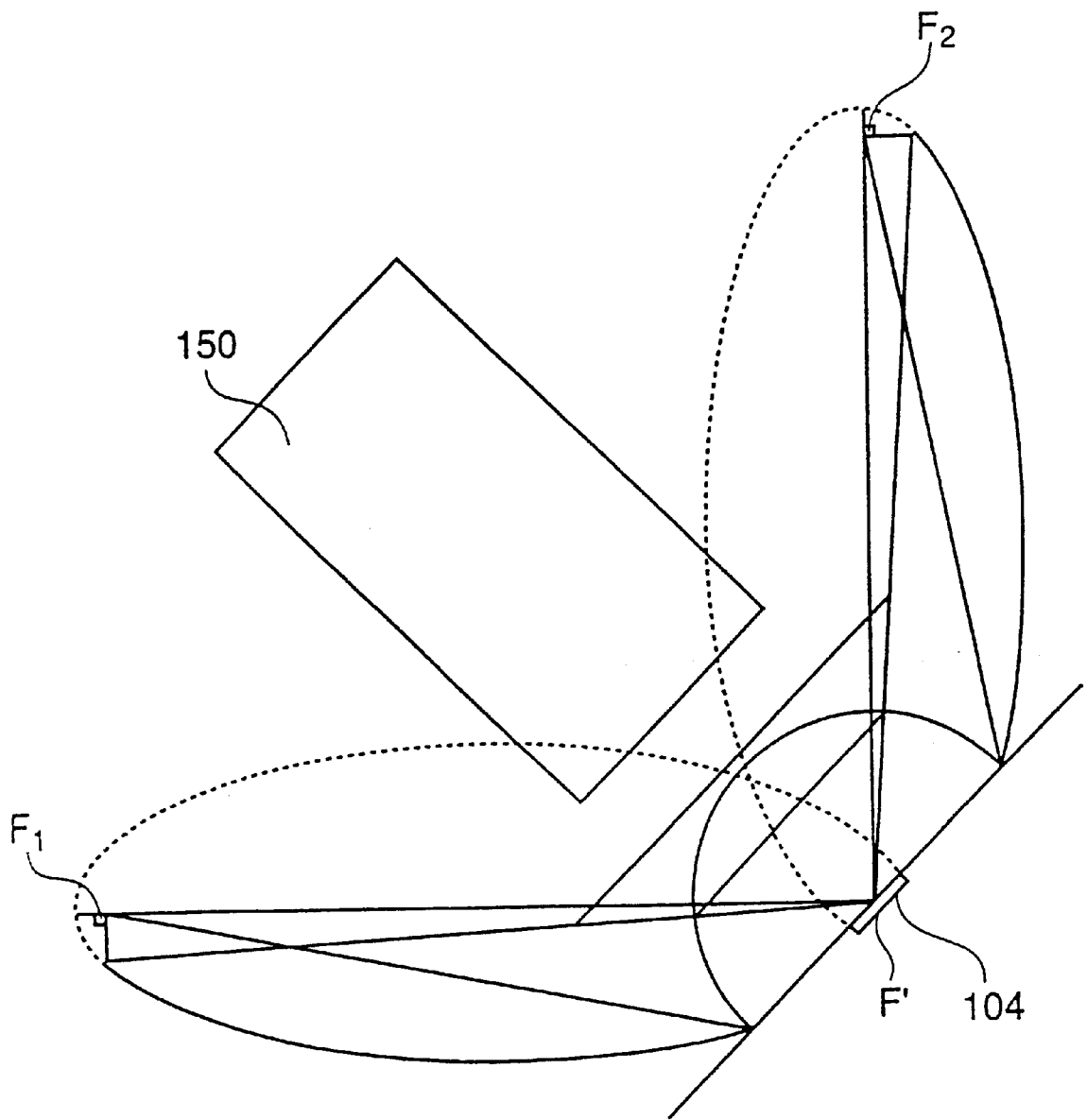
FIG. 5 shows a cross-section of the light guide in the illumination apparatus of the third embodiment of the present invention.

FIG. 5 shows a cross-section of the light guide in an illumination apparatus of the third embodiment. In FIG. 5, two light guides whose cross-section is described in the second embodiment are combined together so as to use an ellipse, whose focus is around the center of the illumination area 104, as a reflection surface. Points F1 and F2 denote focuses on one side, and the scattering mark is formed near the side corresponding to these focuses. The light reflected at the original placed in the illumination area 104 forms an image by a lens array 150 after passing through the light guide 101.

Figure 6:
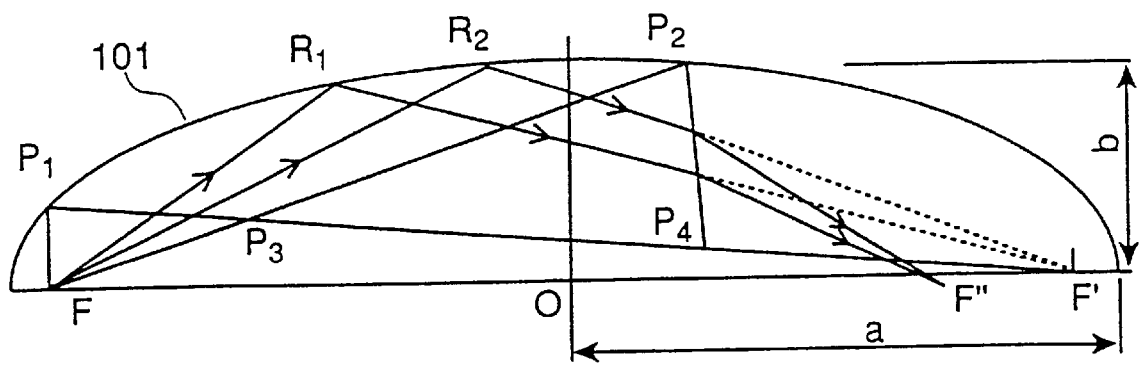
FIG. 6 shows a cross-section of the light guide in the illumination apparatus of the fourth embodiment of the present invention.

Further, FIG. 6 shows a modification of the cross-section of the light guide as the forth embodiment.

In this embodiment, the focus F is connected to the point P3 by a line so as to prevent the direct light from occurring, and all light is reflected at the arc of the ellipse. Forming the surface (the curved portion connecting the points P2 and P4) into a slanted convex not into the arc of a circle having the center F' results in the light conversion point located at a location F'', which is closer and deflected compared with F'. Thus, the actual light conversion point can be provided optionally to a certain degree.

Figure 7:
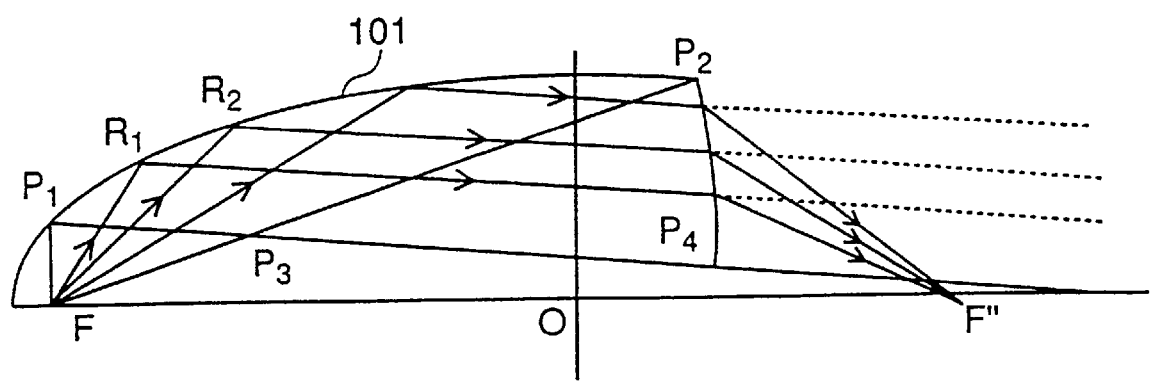
FIG. 7 shows a cross-section of the light guide in the illumination apparatus of the fifth embodiment of the present invention.
Figure 8A:
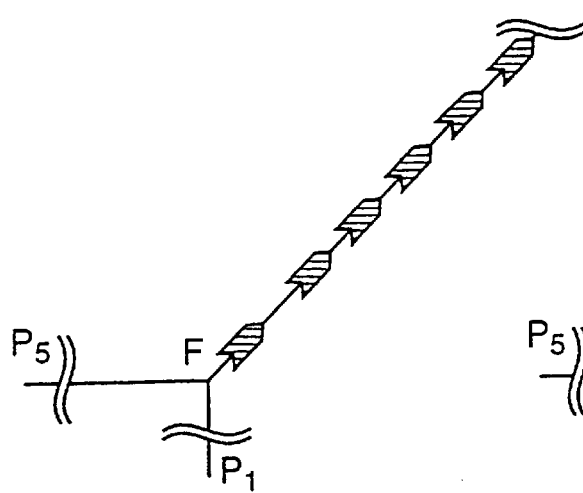
FIG. 8 shows various types of scattering marks formed on the light guide.
Figure 8B:
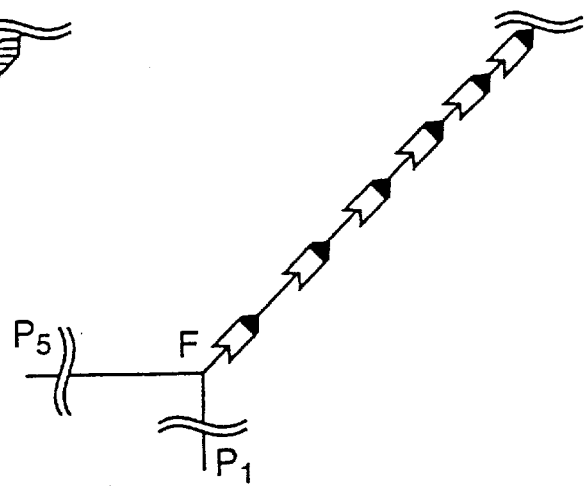
Figure 8C:
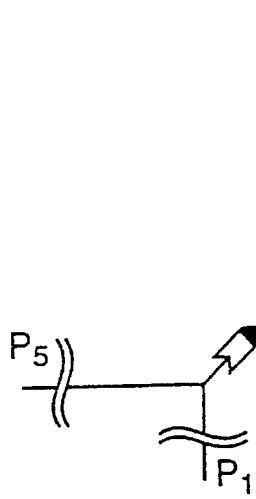
Figure 8D:
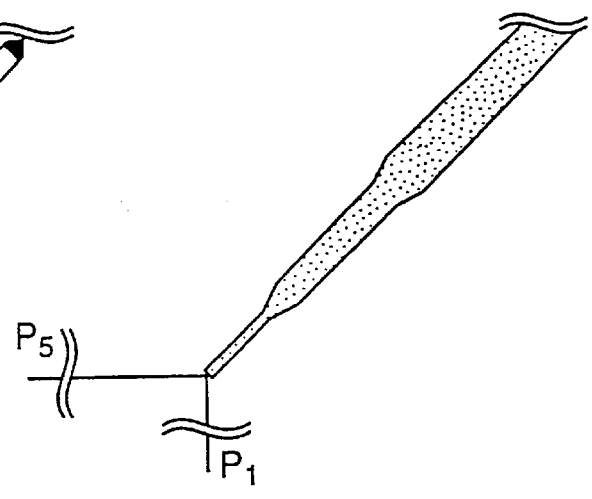
Figure 8E:
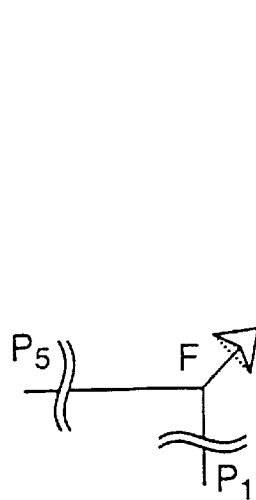
Figure 8F:
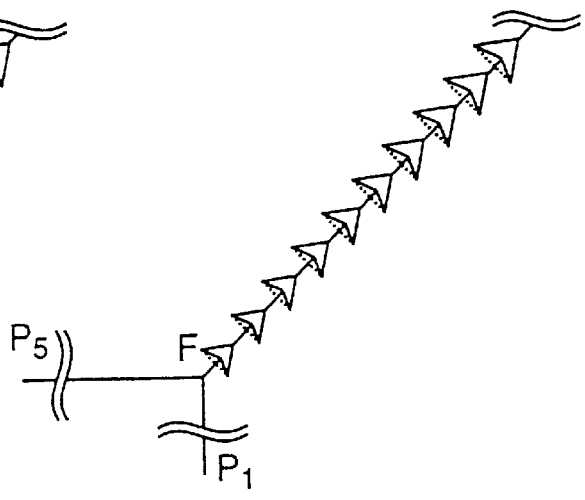

FIG. 7 shows another modification of the cross-section of the light guide as the fifth embodiment.

In the fifth embodiment, a reflection mirror surface is formed in the shape of a parabola whose focus is at the location of the scattering mark. The light reflected at the curved surface connecting the point P1 and P2 becomes a parallel light, thereby the surface (the curved portion connecting the points P2 and P4), through which the light exits from the light guide 101, is formed into a convex lens so that the light would go to the focus F''.

FIG. 8 shows various types of the scattering mark 103 formed on the light guide 101 described above. FIG. 8 shows the scattering mark from the rear of the light guide 101 shown in FIG. 1.

(a) shows scattering marks same as that of shown in FIG. 3 (FIG. 1), which are formed on the surface on the both sides of a side corresponding to F. (b) shows scattering marks formed to have a concave therein. (c) shows scattering marks with their corners of the side cut off at 45 degrees. (d) shows a scattering mark formed by continuous cut-off corners shown in (c), where the uniform illumination is achieved by forming the mark wider as it goes away from the light source. (e) shows scattering marks formed into notches in the shape of a triangle. (a) to (c) and (e) are examples where scattering marks in the same shape are formed such that the density becomes high as it goes away from the light source. (f) shows notches similar to (e) in the shape of a triangle, but the density is almost constant and the size becomes larger gradually as it goes away from the light source.

Accordingly, the marks shown in any of (a) to (c) can operate as a scattering mark, when they are formed into the shape such that the condition of the total reflection as a light guide may not be met. In the case that the angle of the surface of notches are determined so that the light reflected at the surface can be used as an illumination light effectively, or that using diffusion caused by the surface roughness enables to obtain the light with the sufficient efficiency, the surface-process is not required especially. It is possible, however, to coat the surface of the notches with white coating, to form a reflection coat and to combine them so as to adjust the efficiency in order to improve the total performance. They are selected according to the manufacturing cost and required performance, and the selection do not limit the present invention. The marks may be continuous as shown in (d), although they are formed discontinuously in some examples. All of their modification complies with the purpose of the present invention to form the cross-section of the light guide so as to efficiently lead the light to the illumination area, and is within the scope of the present invention.

The sixth embodiment will be described next, referring to FIGS. 9 to 11.

Figure 9:
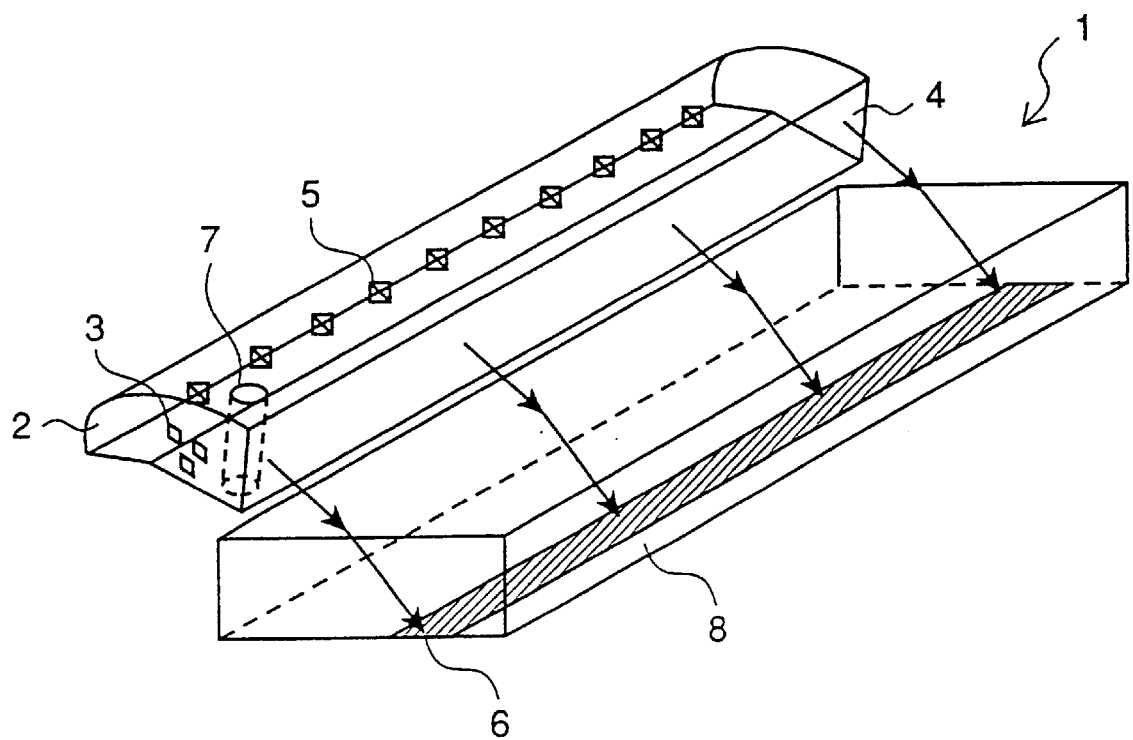
FIG. 9 is a perspective view of the illumination apparatus of the sixth embodiment according to the present invention.

FIG. 9 is a perspective view of an illumination apparatus of the sixth embodiment. An illumination apparatus 1 comprises a light guide 2 made of transparent resin having permeability and a light source LEDs 3 provided at one end of the light guide 2. There are provided 3 LEDs having emission wavelengths of red, green and blue respectively, since the LEDs 3 require the illumination consisting of 3 colors of light when the illumination apparatus 1 is used in a color image scanner and such. A plurality of LEDs 3 is provided as needed. In this embodiment, totally 3 LEDs 3 are provided respectively for each color.

Inside the light guide 2, are formed reflection prisms 5 as scattering marks for scattering the light emitted by the LEDs 3 to output the light through a light exit surface 4. The reflection prisms 5 are notch-shaped wedge concaves formed on the ridge portion where the curved top surface (reflection surface) and the flat side surface (adjacent surface) of the light guide 2 meet each other, and provided plurally in line along the direction of the light emitted by the LEDs 3 and proceeding from one to the other end of the light guide 2. These plural reflection prisms 5 are formed with a space between each other, the distance of which is set to become shorter as it approaches the other end of the light guide 2. One and the other end surfaces of the light guide 2 are arranged to be substantially parallel. The reflection prisms 5 are corresponded to the scattering marks shown in FIG. 8(e).

In addition, a through hole 7 is provided as a reflection portion near the end of the light guide 2 on which the LEDs 3 are provided, so as to block a part of the light transmitted to the other end of the light guide 2. The blocked light is reflected at the surface of the through hole 7 and exits toward around the end of an illumination area 6 near the LEDs 3.

The light exiting through the light exit surface 4 of the light guide 2 exits substantially vertically to the direction of the light transmitted inside the light guide 2 due to the arrangement of the light guide, so that the light guide 2 is placed substantially parallel to the illumination area 6.

In this arrangement, the light emitted by the LEDs 3 are reflected at the inside wall of the light guide 2, transmitted to the other end of the light guide 2 on which the LEDs 3 are not provided. The light is scattered upon hitting the reflection prism 5 formed on the way to the other end, and then, exits outside through the light exit surface 4. The reflection at the inside wall of the light guide 2 does not attenuate the optical energy since it meets the condition of total reflection, so that the optical energy can be transmitted at the high efficiency. The light does not meet the condition of total reflection after hitting the reflection prisms 5, so that it exits outside the light guide 2.

The light reflected upon hitting the surface around the through hole 7 is transmitted in the opposite direction to the light transmitted to the other end of the light guide 2. It directly exits outside through the light exit surface 4 near the LEDs 3 without substantially reflected at the reflection prisms 5, and illuminates the end potion of the illumination area 6 near the LEDs 3.

The light exiting through the light exit surface 4 of the light guide 2 reaches the illumination area 6 after passing through a glass board disposed between the light exit surface 4 and the illumination area 6.

The illumination area illuminated by the light having exited is an area, which is illuminated, of the surface of a flat record medium such as paper on which information such as images to be read by the light are written.

It is also possible to apply white paint or diffusion agent added paint to the surface of the light guide 2 so as to form a reflection portion, or to adhere metal, paper, resin or other members having the diffusion surface by transparent glue so as to form the scattering marks, instead of the reflection prisms 5. It is also possible to optionally optimize the size, depth and density of the reflection prism 5 in order to uniform the illumination of the light illuminating through the light exit surface 4.

In the sixth embodiment described above, providing the through hole 7 near the LEDs 3 of the light guide 2 causes the light from the LEDs 3 to be reflected at the through hole 7 toward the LEDs 3 and to exit through the light exit surface 4. Accordingly, the illumination of the illumination area 6 near the LEDs 3 is improved and that of the illumination area 6 is uniformed.

Now the illumination of the illumination area in this embodiment will be described, referring to a result of the experiment carried out by the inventors.

Figure 10:
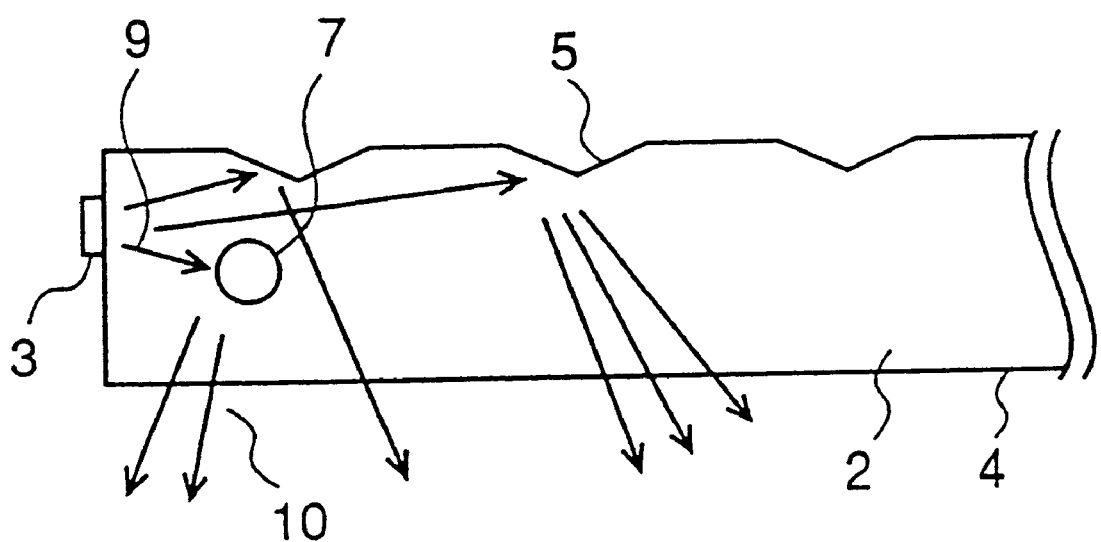
FIG. 10 is a top view of the illumination apparatus of the sixth embodiment according to the present invention.

FIG. 10 is a top view of the light guide of the sixth embodiment.

An incident light 9 having entered to the light guide 2 from the LEDS 3 are divided into three, that is, the light hitting the reflection prisms 5, the light hitting the surfaces around the through hole 7 and the light transmitted to the other end of the light guide 2 without hitting either the reflection prisms 5 or the through hole 7. The incident light 9 becomes a reflected light 10 after hitting the through hole 7 and is transmitted to the left side in FIG. 10.

Figure 11:
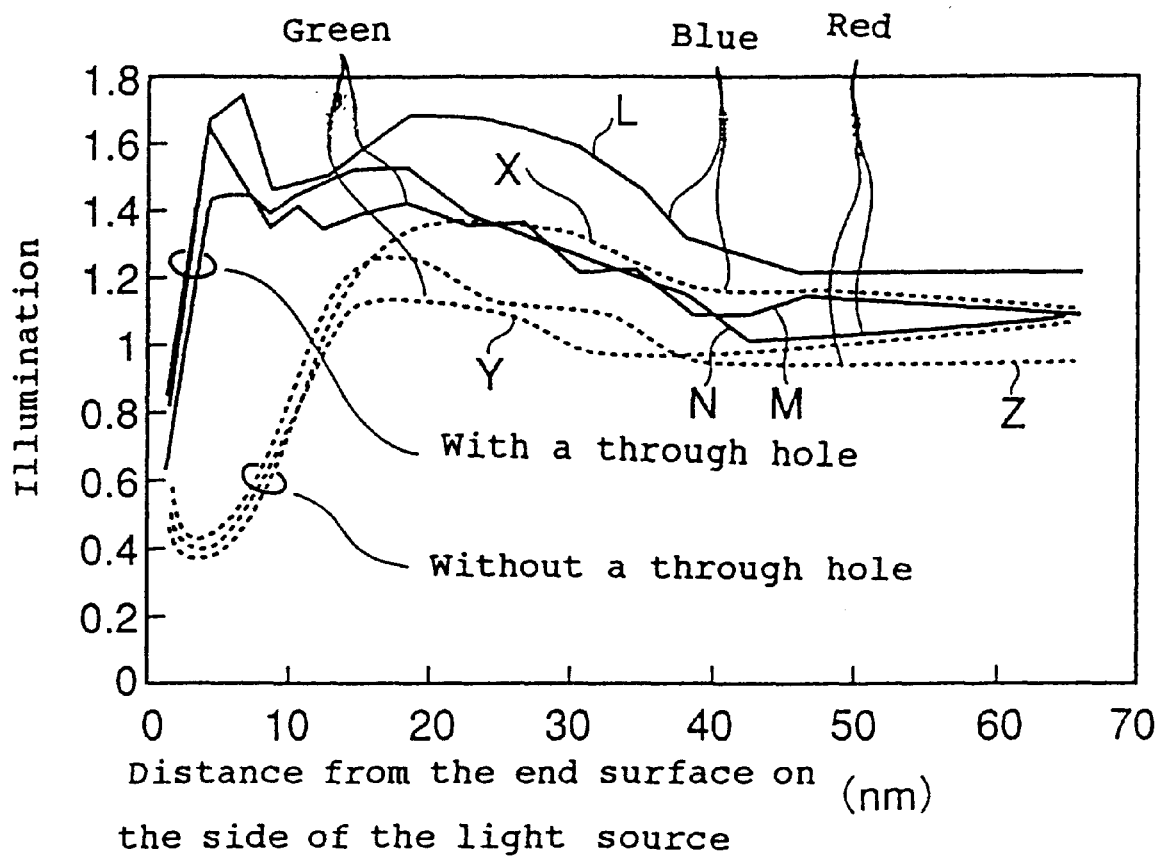
FIG. 11 shows a relation between the distance from the light source of the light guide and the illumination at the illumination area.

FIG. 11 shows a relation between the distance from the LEDs 3 for each color and the illumination, in the case of using the light guide shown in FIG. 10 and in the case of using the conventional light guide that has no through hole 7. In FIG. 11, a line L is for the light guide according to the present invention with a blue LED, a line M is for that of a green LED and a line N is for that of a red LED. A line X is for the conventional light guide with a blue LED, a line Y is for that of a green LED and a line Z is for that of a red LED.

It can be seen from the lines L, M and N better than the lines X, Y and Z that the illumination of the illumination area 6 near the LEDs 3 is significantly improved and the illumination is not reduced even at the location away from the LEDs 3.

The light can be obtained through the light exit surface 4 efficiently with the power of consumption held down by not providing a plurality of LEDs 3 and not increasing the output of the LEDs 3 in order to uniform the illumination of the illumination area 6.

The through hole 7 can be formed at the same time the light guide 2 when a mold of the light guide 2 is formed in advance with a hole in the shape of the through hole 7 by injection molding, for example. It means any new process is not necessary for manufacturing the through hole 7 and the manufacturing cost can be reduced.

Further, the light can be uniformly emitted from a whole area of the light exit surface 4 of the light guide 2, so that there is no areas at the ends of the light guide where the illumination is low and which cannot be illuminated. It contributes to the miniaturization of the illumination apparatus.

The seventh embodiment will be described next, referring to FIG. 12.

In each of the following embodiments, the same reference number represents the same element as that of the sixth embodiment and overlapping description will be omitted.

The feature of the seventh embodiment is that a reflection portion is a notch 11, which is formed by notching a part of the light guide 2.

Figure 12:
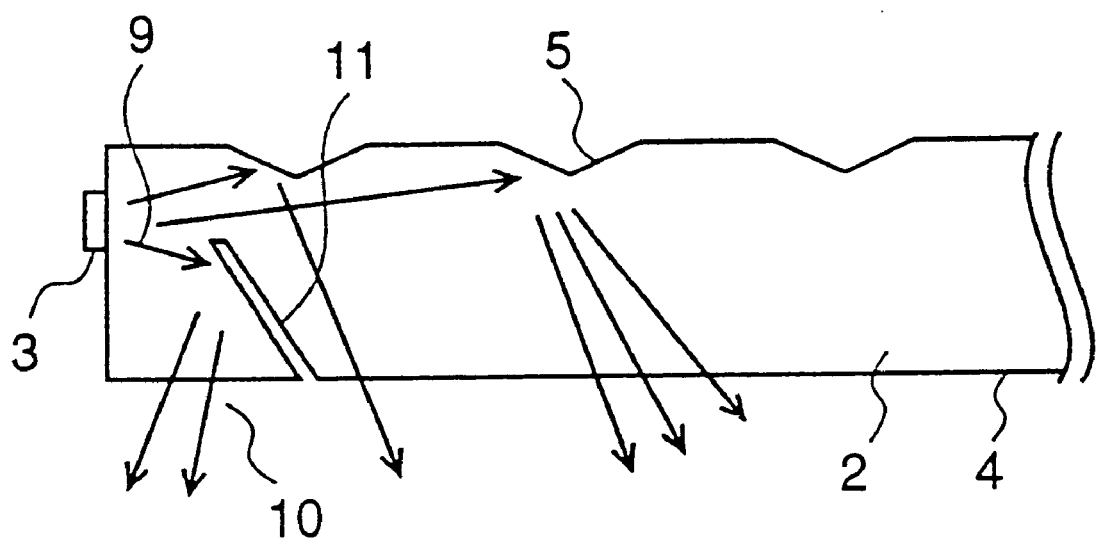
FIG. 12 is a top view of the illumination apparatus of the seventh embodiment according to the present invention.

FIG. 12 is a top view of an illumination apparatus of the seventh embodiment. In FIG. 12, the notch 11 is formed by notching at the end near the LED 3 of the light guide opposite to the location where the reflection prisms 5 are formed. As shown in FIG. 12, the notch 11 extends in the direction of the depth of the light guide 2 and is not notched vertically to the light exit surface 4 but at a certain angle so as to illuminate the illumination area near the LED 3 with the light from the LED 3.

Any shapes of the notch 11, however, are allowed insofar as the light from the LED 3 is used for illuminating the illumination area near the LED 3 so that the illumination all over the area can be substantially uniform. For example, the depth of the notch 11 in the up-down direction in FIG. 12 (depth), the size of the notch 11 on the light exit surface 4 and the width of the notch 11 in the right-left direction in FIG. 12 can be optionally determined, while the notch 11 can be formed between the reflection prisms 5 on the surface provided with the reflection prisms 5, although it is no shown.

According to such arrangement, a part of the light from the LED 3 are reflected after hitting the surface of the notch 11 on the side of LED 3 to illuminate the illumination area near the LED 3, so that the uniform illumination can be obtained all over the illumination area.

The eighth embodiment will be described below, referring to FIG. 13.

The feature of the eighth embodiment is that a reflection portion is a concave formed in a part of the light guide 2.

Figure 13:
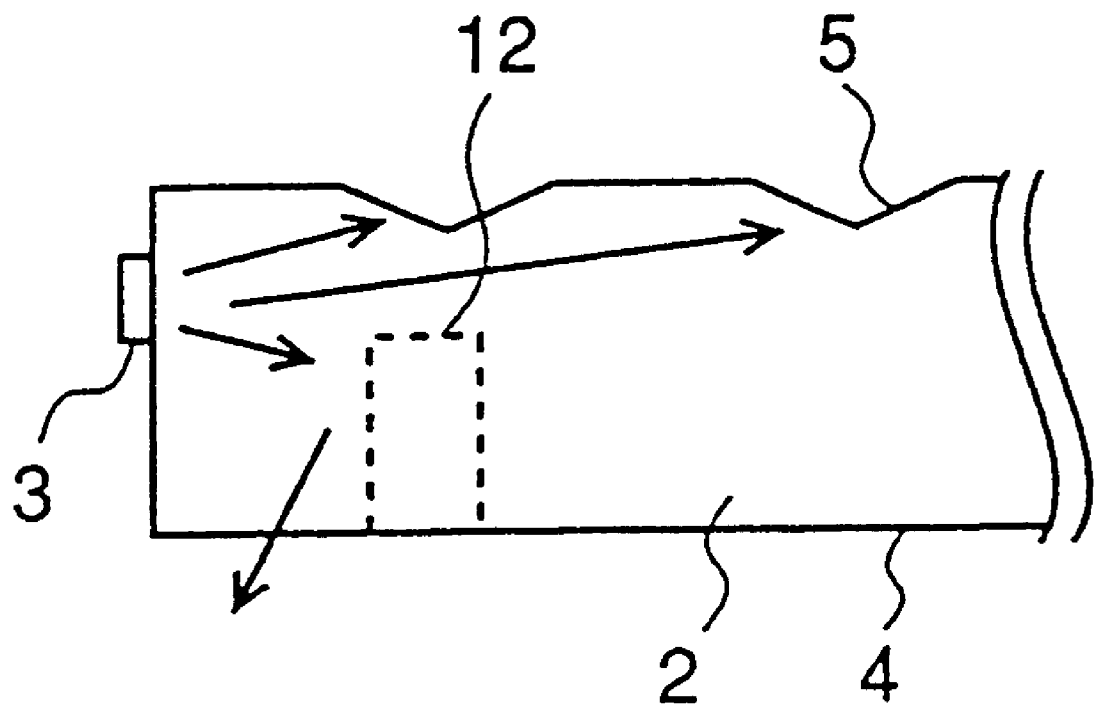
FIG. 13 is a top view of the illumination apparatus of the eighth embodiment according to the present invention.

FIG. 13 is a top view of an illumination apparatus of the eighth embodiment. In FIG. 13, the concave 12 is formed at the end near the LED 3 of the light guide and on a different location on the light exit surface 4 from that the reflection prisms are formed. As shown in FIG. 13, the concave 12 has an opening in the light exit surface 4 and extends vertically to the light exit surface 4 of the light guide 2, namely, in the up-down direction in FIG. 13.

Any shapes of the concave 12, however, are allowed insofar as the light from the LED 3 is used for illuminating the illumination area near the LED 3 so that the illumination all over the area can be substantially uniform. For example, the depth in the un-down direction in FIG. 13, the area of the opening, the angle against the light exit surface 4 can be optionally determined, while the concave 12 can be formed from the side of the surface provided with the reflection prisms 5, although it is no shown.

According to such arrangement, a part of the light from the LED 3 are reflected after hitting the surface of the concave 12 on the side of LED 3 to illuminate the illumination area near the LED 3, so that the uniform illumination can be obtained all over the illumination area.

The ninth embodiment will be described below, referring to FIG. 14.

The feature of the ninth embodiment is that a reflection portion is formed in a longitudinal direction relating to the illumination apparatus.

Figure 14A:
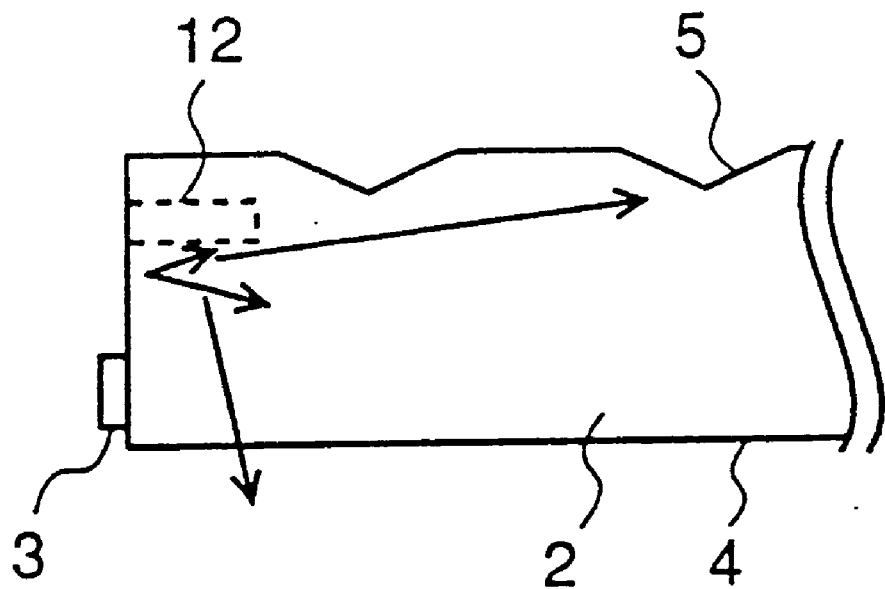
FIGS. 14(a) and 14(b) are top views of the illumination apparatus of the ninth embodiment according to the present invention.
Figure 14B:
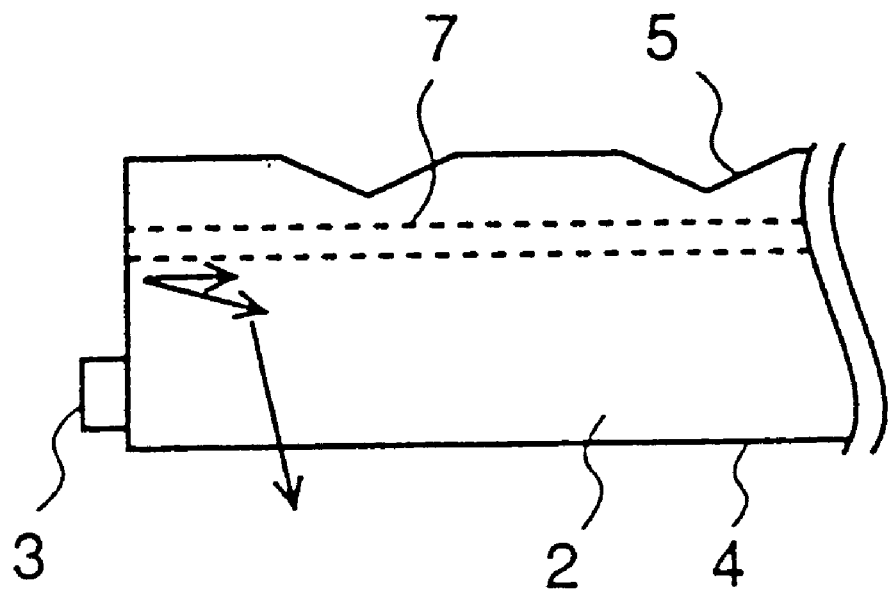

FIGS. 14(a) and (b) are a top view of the light guide of the ninth embodiment.

In FIG. 14(a), the reflection portion is formed as a concave 12 having an opening on the end surface, on which the LED 3 is provided, in a longitudinal direction relative to the light guide 2. On the other hand, in FIG. 14(b), it is formed as a through hole 7 passing through the light guide 2 in the longitudinal direction relative to the light guide 2.

The through hole 7 and the concave 12 are formed between the LED 3 and the reflection prism 5, as shown in Figures.

The area of the cross-section of the through hole 7 or the concave 12, the length of the concave 12 in its longitudinal direction, and the location of the through hole 7 or the concave 12 at the end surface of the light guide 2 are determined optionally.

According to such arrangement, a part of the light from the LED 3 are reflected after hitting the through hole 7 or the concave 12 to illuminate the illumination area near the LED 3, so that the uniform illumination can be obtained all over the illumination area.

The tenth embodiment will be described below, referring to FIGS. 15 and 16.

The feature of the tenth embodiment is that a reflection body 13 is provided at the end of light guide 2, on which the LED 3 is not provided.

Figure 15:
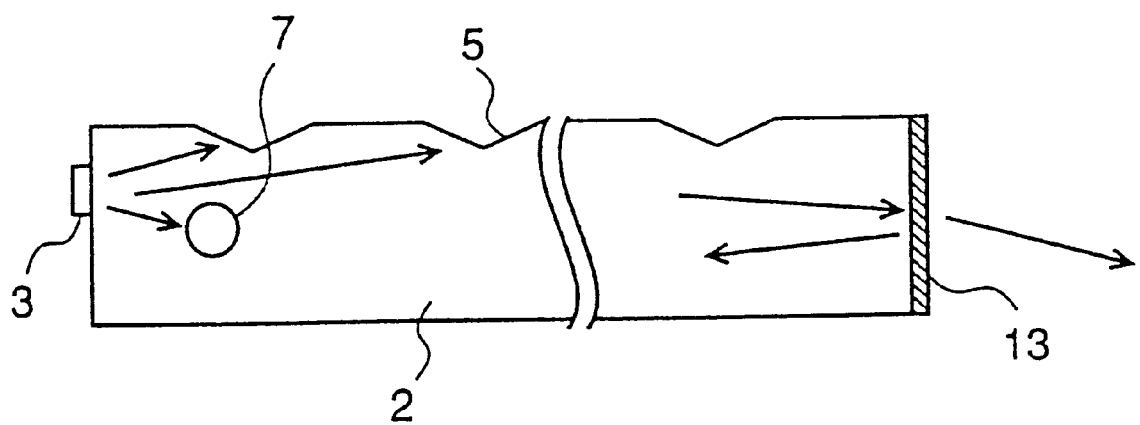
FIG. 15 is a top view of the illumination apparatus of the tenth embodiment according to the present invention.

FIG. 15 is a top view of an illumination apparatus of the tenth embodiment. In FIG. 15, the reflection body 13 is provided as a reflection coat formed at the other end of the light guide 2, on which the Led 3 is not provided, opposite to the LED 3, by vacuum evaporation for forming a mirror surface or by controlling the reflectance by means of deposition of a dielectric.

Figure 16A:
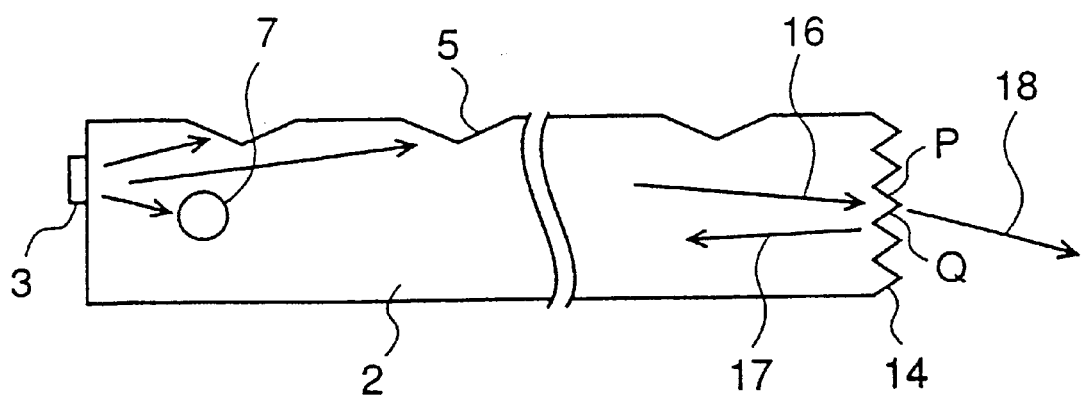
FIGS. 16(a) and 16(b) are a top view and a perspective view showing another reflection body of the illumination apparatus of the tenth embodiment according to the present invention.

The reflection body 13 can be arranged not only in the shape of membrane, but that of broken surface such as a corner reflector 14 and a corner cube 15 or the shape that the area of the cross-section of the light guide becoming gradually smaller, as respectively shown in FIG. 16(a) a top view of the illumination apparatus of the tenth embodiment; (b) a perspective view of another reflection body; and (c) a top view of another reflection body.

As shown in FIG. 16(a), the incident light 16 having entered to the corner reflector 14 are divided into two, that is, a reflection light 17 reflected at the corner reflector 14 opposite to the incident direction and a permeation light 18 permeating into the corner reflector 14. The reflection body 13, which is the corner reflector 14, can reduce the loss of energy due to the permeation of the permeation light 18, so that the intensity of the reflection light 17 can be increased. The reflectance of the corner reflector 14, however, can be determined optionally. The incident light 16 having entered into the corner reflector 14 is reflected twice at the surfaces of the corner reflector 14, for example, in the order of P and Q, and then, returns the reflection light 17 opposite to the incident direction.

Accordingly, the incident angle becomes large against the normal of the end surface of the light guide 2 when the reflection body is the corner reflector 14, so that the light can be used highly effectively without applying a reflection coat to the surface of the corner reflector 14.

Figure 16B:
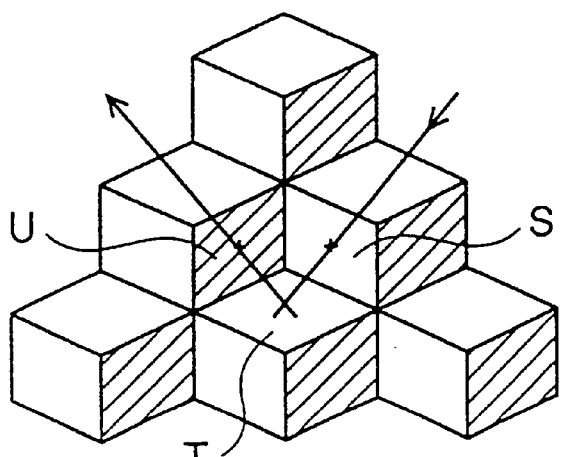

In the case of the corner cube 15, as shown in FIG. 16(b), the incident light to the corner cube 15 is reflected three times at the surfaces thereof, for example, in the order of S, T and U, and then, returns the reflection light opposite to the incident direction.

Figure 16C:
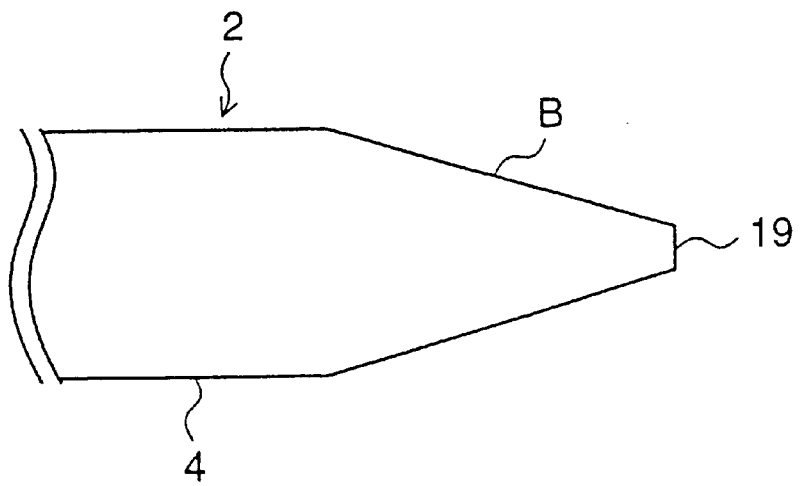
FIG. 16(c) is a tp view showing the cross-section of another reflection body at the tenth embodiment.

The reflection body 13 can be formed so that the area B of its cross-section is made smaller gradually as the end of the light guide 2 goes away from the LED 3, as shown in FIG. 16 (c). In this case, the light finally enters into the bottom 19 of the reflection body 13 after reflected at the slanted surfaces of the reflection body 13, and then, reflected toward the LED 3 of the light guide 2.

The reflection body 13 arranged as described above can reflect the light, which causes the loss of energy by permeating from the end of the light guide 2 as a permeation light, and transmit it back inside the light guide 2 so as to use the light emitted from the LED 3 for efficiently illuminating the illumination area.

It goes without saying that the present invention is not limited to the above embodiments and that it can be put into practice with various modifications within the scope thereof. For example, the number and the shape of the through hole, notch or convex used as a reflection portion is not limited insofar as scattering the light from the LED can uniform the illumination of the illumination area. The cross-section may have corners rather than being circle.

Further, attaching metal, resin or ink to, processing for forming a mirror surface of or for roughing the area receiving the light in the through hole, notch or convex as a reflection portion in order to control the reflectance can improve the efficiency of the use of the light emitted from the LED.

Fixing the light guide, securing the mechanical strength and adjusting the illumination characteristics allow the inner space of a reflection portion to be filled with any member in the substantially same shape as that of the inner space, while the through hole, notch or convex as a reflection portion is used with the inner space vacant.

The reflection materials to be applied to the reflection body are not necessarily coated all over the end surface of the light guide. They also can be arranged such that, taking account of the influence on the illumination area by the reflection light from the reflection body, the reflection materials are only applied near the reflection prism, not near the light exit surface.

The eleventh embodiment will be described below, referring to FIG. 17.

Figure 17:
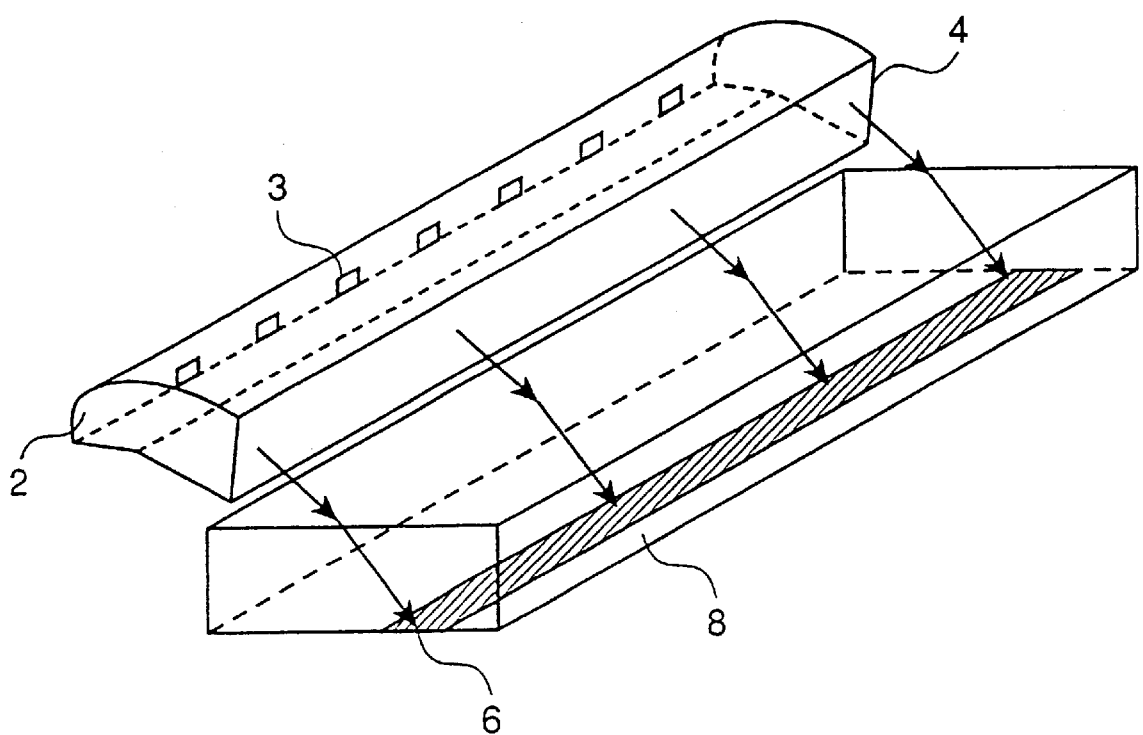
FIG. 17 is a top view of the illumination apparatus of the eleventh embodiment according to the present invention.

The feature of the eleventh embodiment is that, as shown in FIG. 17, a plurality of the light source LEDs 3 are provided along the longitudinal direction relative to the light guide 2 on the ridge portion, where the curved top surface (reflection surface) and the flat side surface (adjacent surface) of the light guide 2 meet each other, rather than on the end surface of the light guide 2. In each embodiment described above, the reflection prism (scattering mark) scatters the light emitted by the LED provided on the end surface of the light guide 2 so as to use the scattered light as an illumination light. On the other hand, in this embodiment, using the light emitted by a plurality of the LEDs 3 provided along the longitudinal direction relative to the light guide 2 results in an illumination apparatus suitable for the illumination that requires larger amount of light. Either light guide 2 shown in FIGS. 1 to 5 described above can be used here.

An arrangement of an image acquisition system according to the present invention will be described below, referring to FIG. 18.

Figure 18:
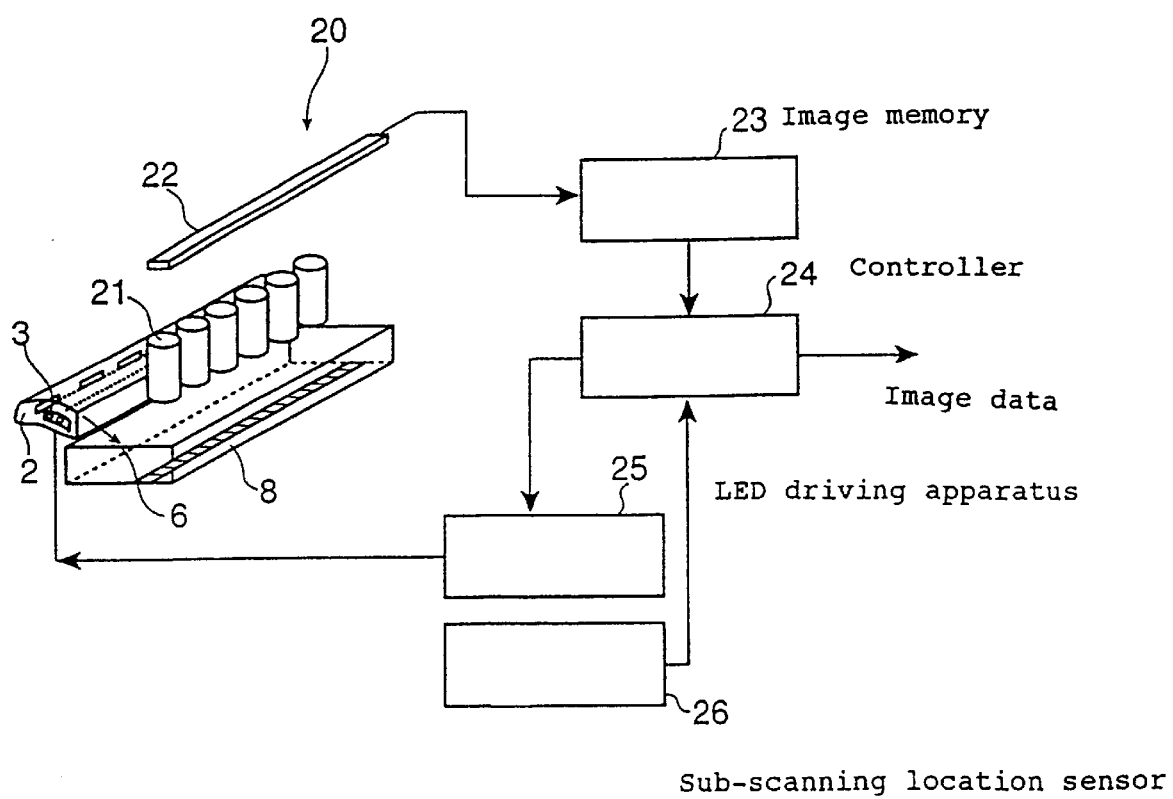
FIG. 18 is a schematic view of an arrangement of the image acquisition system according to the present invention.
Figure 19:
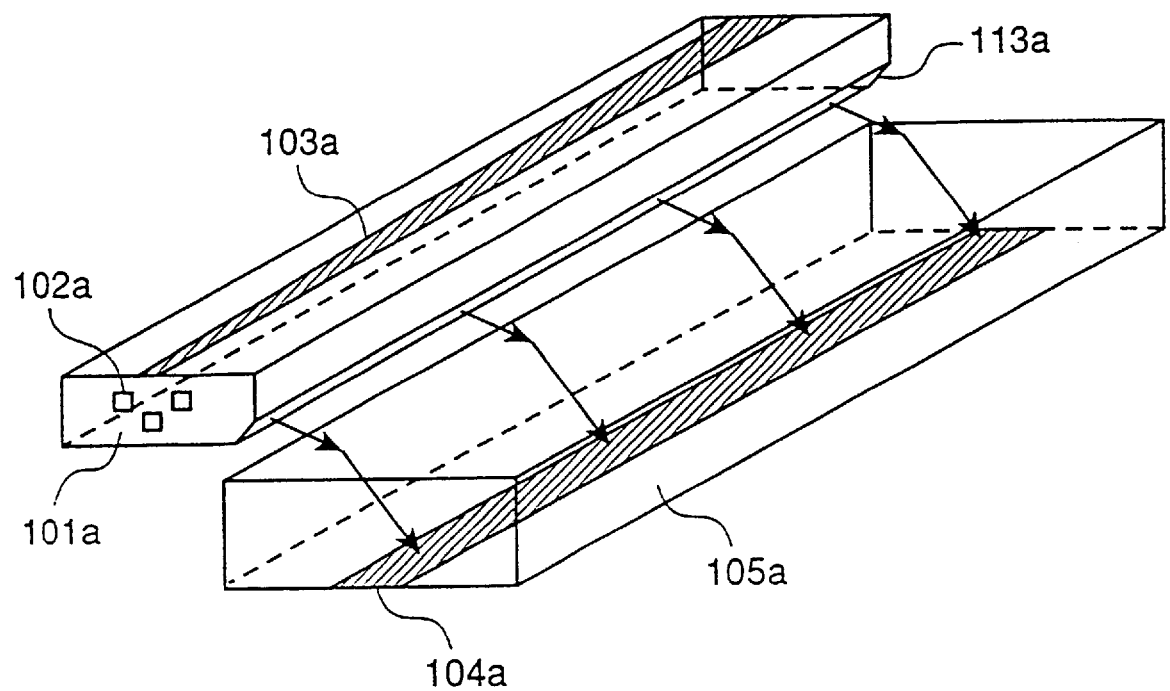
FIG. 19 shows an arrangement of the conventional illumination apparatus.
Figure 20:
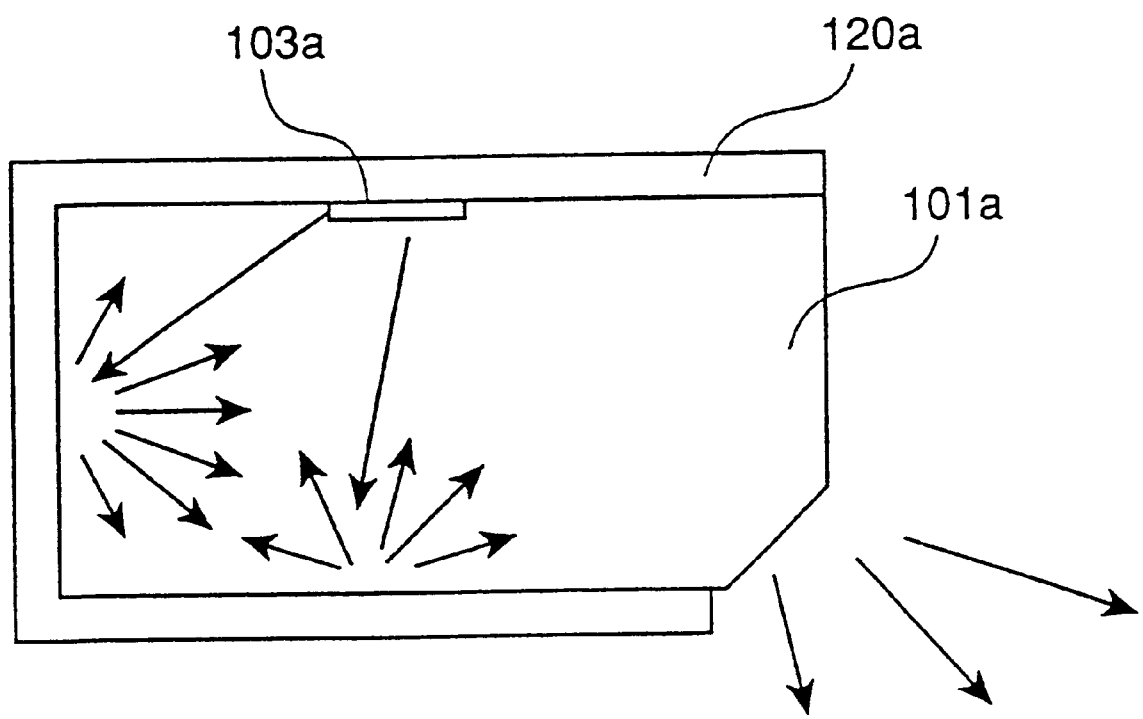
FIG. 20 shows a cross-section of the light guide in the conventional illumination apparatus.

FIG. 18 is a schematic view of the image acquisition system according to the present invention. In FIG. 18, an image acquisition system 20 comprises an illumination apparatus 1, a plurality of lens array 21 in line above a glass board 8, substantially parallel to the illumination area illuminated through the glass board 8 by the light exiting from the light guide 2 of the illuminating apparatus 1, and an image sensor 22 provided above the lens array 21, wherein the illumination apparatus 1, the lens array 21 and the image sensor 22 are integrated into one body.

The lens array 21 is an equal magnification erect image forming device such as cell fox lens array, while the image sensor 22 is an image device such as one dimension CCD line sensor.

The illumination area 6 is an area illuminated by the light, which exits from the light guide 2, after hitting a part of the flat medium such as paper on the surface of which information such as images desired to be read are written.

The medium is laid on the surface of the glass board 8 on the side where the lens array 21 is not provided.

An image acquisition system with such arrangement will be described below.

The light emitted by the LEDs 3 is scattered at the reflection prism during transmission in the longitudinal direction relative to the light guide 2, exits outside through the light exit surface of the light guide 2, passing through the glass board 8 and illuminates the illumination area 6 on the medium.

A part of the light illuminating and reflected at the illumination area 6 on the medium forms an image on a linear image sensor 22, since the image formed by the lens array 21 via the glass board 8 is in line and overlaps each other.

The image sensor 22 read the light image formed by the lens array 21 to store the read information in an image memory 23 as image data.

The image data is stored in the image memory 23 as image data for each color corresponding to the switching of the LEDs 3, when there are three colors (red, blue and green) of the LEDs 3.

An operation for switching of the LEDs 3 is controlled by a controller 24 into which image data of each color stored is inputted.

The operation for switching of the LEDs 3 starts upon inputted signals from the controller 24 into an LED drive device 25.

After thus inputted a line of the image data, the drive device (not shown) moves the illumination apparatus 1 to move the illumination area in a sub scanning direction, wherein the sub scanning direction is assumed to be a direction vertically crossed with the illumination area 6 on the medium while the illumination area 6 is assumed to be a main scanning direction, so that the two dimensions image data can be obtained.

New image data of the illumination area after moving the illumination apparatus 1 is stored in the image memory 23 for inputting by means of such operation as described above.

A sub scanning location sensor 26 detects the location of the illumination apparatus 1 in the sub scanning direction. The detected signals are sent to the controller 24, which controls the location of the illumination apparatus 1 in the sub scanning direction on the basis of the signals sent.

Thus, the image data corresponding to each line is stored in the image memory 23 with the illumination area shifted little by little, so that the image on the medium surface is read.

The image data read by the medium are sent to a device in charge of processing such as imaging or embodying on the medium such as paper.

In the image acquisition system described above, the whole illumination area 6 illuminated by the light exiting from the light guide 2 can be illuminated at the uniform illumination, so that the efficiency of the light emitted by the LED 3 can be improved, the cost for improving the efficiency can be reduced and the system can be miniaturized.

It goes without saying that the present invention is not limited to the above embodiment and that it can be put into practice with various modifications within the scope thereof. For example, the movement in the sub scanning direction can be achieved not by the movement of the illumination apparatus but the movement of the medium with the illumination apparatus fixed in order to read the image on the medium.

In all of the embodiments described above, it is possible to apply materials, which can be used as a reflection agent, to the outer periphery of the light guide in order to hold down the light exiting outside from the light guide, so that the efficiency is improved in using the light.

The illumination apparatus and the image acquisition system can be provided on a facsimile and copy machines and hand-scanner, wherein an operation of reading an image on the surface of a medium as a plurality of illumination areas can be carried out.

As described above, the light scattered at the scattering mark is lead effectively to the illumination area and a line illumination apparatus with the high efficiency and a simple construction can be obtained according to the present invention.

Further, adopting the light guide according to the present invention allows a low cost and compact line illumination apparatus or image acquisition system to be provided.

Moreover, the light emitted by the light source is reflected at the reflection portion of the light guide, so that the illumination all over the illumination area illuminated by the reflected light can be uniform.

What is claimed is:

1. A light guide comprising:
    a transparent member in the shape of a bar, the transparent member configured to transmit a light therein;
    a scattering mark configured to scatter the light substantially vertical to a longitudinal direction of the transparent member;
    a reflection surface, having a curved surface, configured to reflect the light scattered at the scattering mark inside the transparent member; and
    a light exit surface configured to enable the light reflected at the reflection surface to exit outside the transparent member therethrough, wherein:
        the shape of the reflection surface is determined so that the light scattered at the scattering mark is focused directly onto a predetermined position outside the transparent member;
        the shape of the curved surface of the reflection surface is determined by an optimizing calculation so that the light scattered at the scattering mark should illuminate the predetermined position outside the transparent member; and
        majority of contribution to the illumination is attributed to the reflected light.

2. The light guide according to claim 1, wherein the shape of a cross-section of the reflection surface, being vertical to the longitudinal direction of the transparent member, is an arc of an ellipse, a parabola, an arc of a substantial ellipse or a substantial parabola, whose one focus is located near the location of the scattering mark.

3. The light guide according to claim 1, wherein the scattering mark is formed near a ridge portion facing to the light exit surface of the transparent member.

4. A light guide comprising:
    a transparent member in the shape of a bar, the transparent member configured to transmit a light therein;

a scattering mark configured to scatter the light substantially vertical to a longitudinal direction of the transparent member;
a reflection surface, having a curved surface, configured to reflect the light scattered at the scattering mark inside the transparent member;
a first light exit surface configured to enable the light reflected at the reflection surface to exit outside the transparent member therethrough; and
a second light exit surface configured to enable the light scattered at the scattering mark to exit outside of the transparent member therethrough, wherein:
the shape of the reflection surface is determined so that the light scattered at the scattering mark is focused directly onto a predetermined position outside the transparent member;
the shape of the curved surface of the reflection surface is determined by an optimizing calculation so that the light scattered at the scattering mark should illuminate the predetermined position outside the transparent member; and
majority of contribution to the illumination is attributed to the reflected light.

5. The light guide according to claim 4, wherein the shape of a cross-section of the reflection surface, being vertical to the longitudinal direction of the transparent member, is an arc of an ellipse, a parabola, an arc of a substantial ellipse or a substantial parabola, whose one focus is located near the location of the scattering mark.

6. The light guide according to claim 4 wherein the scattering mark is formed near a ridge portion facing to the light exit surface of the light guide.

7. A line illumination apparatus comprising:
a light guide including a transparent member in the shape of a bar, the transparent member configured to transmit a light therein; and
a light source provided at the end of the light guide in the longitudinal direction of the light guide;
wherein the light guide comprises
a scattering mark configured to scatter the light substantially vertical to a longitudinal direction of the transparent member;
a reflection surface, having a curved surface, configured to reflect the light scattered at the scattering mark inside the transparent member; and
a light exit surface configured to enable the light reflected at the reflection surface to exit outside the transparent member therethrough, wherein:
the shape of the reflection surface is determined so that the light scattered at the scattering mark is focused directly onto a predetermined position outside the transparent member;
the shape of the curved surface of the reflection surface is determined by an optimizing calculation so that the light scattered at the scattering mark should illuminate the predetermined position outside the transparent member; and
majority of contribution to the illumination is attributed to the reflected light.

8. The line illumination apparatus according to claim 7, wherein the shape of a cross-section of the reflection surface, being vertical to the longitudinal direction of the transparent member, is an arc of an ellipse, a parabola, an arc of a substantial ellipse or a substantial parabola, whose one focus is located near the location of the scattering mark.

9. The line illumination apparatus according to claim 7, wherein the scattering mark is formed near a ridge portion facing to the light exit surface of the transparent member.

10. A line illumination apparatus comprising:
a light guide including a transparent member in the shape of a bar, the transparent member configured to transmit a light therein; and
a light source provided at the end of the light guide in the longitudinal direction of the light guide;
wherein the light guide comprises
a scattering mark configured to scatter the light substantially vertical to a longitudinal direction of the transparent member;
a reflection surface, having a curved surface, configured to reflect a light scattered at the scattering mark inside the transparent member;
a first light exit surface configured to enable a light reflected at the reflection surface to exit outside the transparent member therethrough; and
a second light exit surface configured to enable a light scattered at the scattering mark to exit outside of the transparent member therethrough, wherein:
the shape of the reflection surface is determined so that the light scattered at the scattering mark is focused directly onto a predetermined position outside the transparent member;
the shape of the curved surface of the reflection surface is determined by an optimizing calculation so that the light scattered at the scattering mark should illuminate the predetermined position outside the transparent member; and
majority of contribution to the illumination is attributed to the reflected light.

11. The line illumination apparatus according to claim 10, wherein the shape of a cross-section of the reflection surface, being vertical to the longitudinal direction of the transparent member, is an arc of an ellipse, a parabola, an arc of a substantial ellipse or a substantial parabola, whose one focus is located near the location of the scattering mark.

12. The line illumination apparatus according to claim 10, wherein the scattering mark is formed near a ridge portion facing to the light exit surface of the transparent member.

13. An image acquisition system comprising:
a light guide including a transparent member in the shape of a bar, the transparent member configured to transmit a light therein;
a light source provided at the end of the light guide in a longitudinal direction of the light guide;
an image forming optical device configured to form an image of a light from an illumination area illuminated by a light exiting from the light guide; and
an image sensor configured to read a light of the image formed by the image forming optical device,
wherein the light guide comprises
a scattering mark configured to scatter the light substantially vertical to the longitudinal direction of the transparent member;
a reflection surface, having a curved surface, configured to reflect the light scattered at the scattering mark inside the transparent member; and
a light exit surface configured to enable the light reflected at the reflection surface to exit outside the transparent member therethrough, wherein:
the shape of the reflection surface is determined so that the light scattered at the scattering mark is focused directly onto a predetermined position outside the transparent member;
the shape of the curved surface of the reflection surface is determined by an optimizing calculation so that the light scattered at the scattering mark should illuminate the predetermined position outside the transparent member; and majority of contribution to the illumination is attributed to the reflected light.

14. An image acquisition system comprising: a light guide including a transparent member in the shape of a bar, the transparent member configured to transmit a light therein;
   a light source provided at the end of the light guide in a longitudinal direction of the light guide;
   an image forming optical device configured to forming an image of a light from an illumination area illuminated by a light exiting from the light guide; and
   an image sensor configured to read a light of the image formed by the image forming optical device,
   wherein the light guide comprises
      a scattering mark configured to scatter the light substantially vertical to the longitudinal direction relative to the transparent member;
      a reflection surface, having a curved surface, configured to reflect the light scattered at the scattering mark inside the transparent member;
      a first light exit surface configured to enable the light reflected at the reflection surface to exit outside the transparent member therethrough; and
      a second light exit surface configured to enable the light scattered at the scattering mark to exit outside of the transparent member therethrough, wherein:
         the shape of the reflection surface is determined so that the light scattered at the scattering mark is focused directly onto a predetermined position outside the transparent member;
   the shape of the curved surface of the reflection surface is determined by an optimizing calculation so that the light scattered at the scattering mark should illuminate the predetermined position outside the transparent member; and
   majority of contribution to the illumination is attributed to the reflected light.

15. A line illumination apparatus comprising:
   a light guide including of a transparent member in the shape of a bar, the transparent member configured to transmit a light therein; and
   a light source provided at a first end of the light guide in a longitudinal direction of the light guide;
   wherein the light guide comprises
      a scattering mark configured to scatter the light emitted by the light source;
      a reflection surface having a curved surface configured to reflect the light scattered at the scattering mark inside the transparent member;
      a light exit surface configured to enable the light reflected at the reflection surface to exit outside the transparent member therethrough; and
      a reflection portion, provided near the first end, configured to interrupt the light, which is emitted by the light source and has not reached the scattering mark, to be transmitted to a second end facing to the first end and for reflecting the interrupted light so as to enable the interrupted light to exit from the light exit surface located near the light source, wherein:
         the shape of the reflection surface is determined so that the light scattered at the scattering mark is formed onto a predetermined position outside the transparent member.

16. The line illumination apparatus according to claim 15, wherein the reflection portion is a through hole provided in the transparent member, a concave formed on a surface of the transparent member, the surface which is located differently from the location the scattering mark is provided, or a notch formed on a surface of the transparent member, the surface which is located differently from the location the scattering mark is provided.

17. The line illumination apparatus according to claim 15, wherein the second end is provided with a reflection body for reflecting in a direction toward the first end a light emitted by the light source and transmitted inside the transparent member.

18. The line illumination apparatus according to claim 17, wherein the reflection body is formed to be a broken surface arrangement in the shape of a corner reflector or a corner cube.

19. An image acquisition system comprising:
   a light guide including a transparent member in the shape of a bar, the transparent member configured to transmit a light therein;
   a light source provided at the end of the light guide in a longitudinal direction of the light guide;
   an image forming optical device configured to form an image of a light from an illumination area illuminated by a light exiting from the light guide; and
   an image sensor configured to read a light of the image formed by the image forming optical device,
   wherein the light guide comprises
      a scattering mark configured to scatter the light emitted by the light source;
      a reflection surface having a curved surface configured to reflect the light scattered at the scattering mark inside the transparent member;
      a light exit surface configured to enable the light reflected at the reflection surface to exit outside the light guide therethrough; and
      a reflection portion, provided near the first end, configured to interrupt the light, which is emitted by the light source and has not reached the scattering mark, to be transmitted to a second end facing to the first end and for reflecting the interrupted light so as to enable the interrupted light to exit from the light exit surface located near the light source, wherein:
         the shape of the reflection surface is determined so that the light scattered at the scattering mark is formed onto a predetermined position outside the transparent member.

20. The image acquisition system according to claim 19, wherein the reflection portion is a through hole provided in the transparent member, a concave formed on a surface of the transparent member, the surface which is located differently from the location the scattering mark is provided, or a notch formed on a surface of the transparent member, the surface which is located differently from the location the scattering mark is provided.

21. The image acquisition system according to claim 19, wherein the second end is provided with a reflection body for reflecting in a direction toward the first end a light emitted by the light source and transmitted inside the transparent member.

22. The line illumination apparatus according to claim 21, wherein the reflection body is formed to be a broken surface arrangement in the shape of a corner reflector or a corner cube.

23. A line illumination apparatus comprising:
a light guide including of a transparent member in the shape of a bar, the transparent member configured to transmit a light therein; and
a plurality of light sources provided along a longitudinal direction of the transparent member;
wherein the light guide comprises
a reflection surface, having a curved surface, configured to reflect the light emitted by the light source inside the transparent member; and
a light exit surface configured to enable the light reflected at the reflection surface to exit outside the transparent member therethrough, wherein:
the shape of the reflection surface is determined so that the light scattered at the scattering mark is focused directly onto a predetermined position outside the transparent member;
the shape of the curved surface of the reflection surface is determined by an optimizing calculation so that the light scattered at the scattering mark should illuminate the predetermined position outside the transparent member; and
majority of contribution to the illumination is attributed to the reflected light.

24. The line illumination apparatus according to claim 23, wherein the shape of a cross-section of the reflection surface is an arc of an ellipse, a parabola, an arc of a substantial ellipse or a substantial parabola, whose one focus is located near the location of the light source.

25. The line illumination apparatus according to claim 23, wherein the light source is provided near a ridge portion facing to the light exit surface.

26. An image acquisition system comprising:
a light guide including of a transparent member in the shape of a bar, the transparent member configured to transmit a light therein;
a plurality of light sources provided along a longitudinal direction of the light guide;
an image forming optical device configured to form an image of a light from an illumination area illuminated by a light exiting from the light guide; and
an image sensor configured to read a light of the image formed by the image forming optical device,
wherein the light guide comprises
a reflection surface, having a curved surface, configured to reflect the light emitted by the light source inside the transparent member; and
a light exit surface configured to enable the light reflected at the reflection surface to exit outside the transparent member therethrough, wherein:
the shape of the reflection surface is determined so that the light scattered at the scattering mark is focused directly onto a predetermined position outside the transparent member;
the shape of the curved surface of the reflection surface is determined by an optimizing calculation so that the light scattered at the scattering mark should illuminate the predetermined position outside the transparent member; and
majority of contribution to the illumination is attributed to the reflected light.

* * * * *